US006658483B1

(12) United States Patent
Iwamoto et al.

(10) Patent No.: US 6,658,483 B1
(45) Date of Patent: Dec. 2, 2003

(54) ELECTRONIC TRANSACTION SYSTEM AND METHOD AND STORAGE MEDIUM STORING THEREIN CONTROL PROGRAM FOR EXECUTING FORMAT CONVERSION IN ELECTRONIC TRANSACTION

(75) Inventors: Takashi Iwamoto, Kawasaki (JP); Yoshiyuki Kokubo, Kawasaki (JP); Tutomu Fujita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/075,219

(22) Filed: May 11, 1998

(30) Foreign Application Priority Data

Dec. 19, 1997 (JP) .............................................. 9-350683

(51) Int. Cl.[7] .............................................. G06F 15/16
(52) U.S. Cl. .............................. 709/246; 709/223; 705/1
(58) Field of Search ................................ 709/246, 205, 709/208, 201, 224, 223, 313; 705/1, 40, 79, 26, 4, 35; 345/333; 717/8, 1, 102; 713/200; 714/16, 49; 703/27; 379/221; 707/10, 104, 4, 500.1

(56) References Cited

U.S. PATENT DOCUMENTS

| 5,202,977 | A | * | 4/1993 | Pasetes, Jr. et al. ........... 703/27 |
| 5,367,664 | A | * | 11/1994 | Magill et al. .................. 714/16 |
| 5,557,780 | A | * | 9/1996 | Edwards et al. ............... 703/27 |
| 5,608,874 | A | * | 3/1997 | Ogawa et al. ................. 709/246 |
| 5,634,053 | A | * | 5/1997 | NOble et al. ................... 707/4 |
| 5,715,397 | A | * | 2/1998 | Ogawa et al. ................. 709/246 |
| 5,758,126 | A | * | 5/1998 | Daniels et al. ............... 345/333 |
| 5,898,838 | A | * | 4/1999 | Wagner ....................... 709/224 |
| 5,913,214 | A | * | 6/1999 | Madnick et al. ............... 707/10 |
| 5,930,512 | A | * | 7/1999 | Boden et al. ................. 717/102 |
| 5,956,688 | A | * | 9/1999 | Kokubo et al. ................. 705/1 |
| 5,983,228 | A | * | 11/1999 | Kobayashi et al. ............ 707/10 |
| 6,003,007 | A | * | 12/1999 | DiRienZo ....................... 705/4 |
| 6,023,684 | A | * | 2/2000 | Pearson ........................ 705/35 |
| 6,061,665 | A | * | 5/2000 | Bahreman ..................... 705/40 |
| 6,101,556 | A | * | 8/2000 | Piskiel et al. ................ 709/313 |
| 6,128,624 | A | * | 10/2000 | Papierniak et al. .......... 707/104 |
| 6,249,578 | B1 | * | 6/2001 | Gilles et al. ................. 379/221 |
| 6,256,667 | B1 | * | 7/2001 | Wahlander et al. ........... 709/218 |
| 6,275,977 | B1 | * | 8/2001 | Nagai et al. ................... 717/1 |
| 6,397,230 | B1 | * | 5/2002 | Carmel et al. ............. 707/500.1 |

OTHER PUBLICATIONS

Green, Databasing diversity–a distributed, public–domain approach, 1994.http://llife.csu.edu.au/~dgreen/papers/tax-on.html.*
Using Microsoft Exchange Server, http://sunsite.net.edu.cn/tutorials/seexch/toc.htm 1996*
Report on Maintenance issues Associated with the EIIP EDI X12 Convention Document , www.epa.gov/ttn/chief/eiip/committee/data₁₃management/concept.pdf, 1997.*

* cited by examiner

Primary Examiner—Mark Powell
Assistant Examiner—Thong Vu
(74) Attorney, Agent, or Firm—Staas & Halsey LLP

(57) ABSTRACT

A set-up supporting server stores a model table which is used for conversion of a translator of a client for order receiver and a set-up supporting tool for correcting the model table and setting up into the translator. A set-up processing module of the client for order receiver receives a down-load of the model table 72 and set-up supporting tool in response to a supporting request to the set-up supporting server and automatically executes a set-up process of the translator 36 on the basis of an input of predetermined individual information.

24 Claims, 44 Drawing Sheets

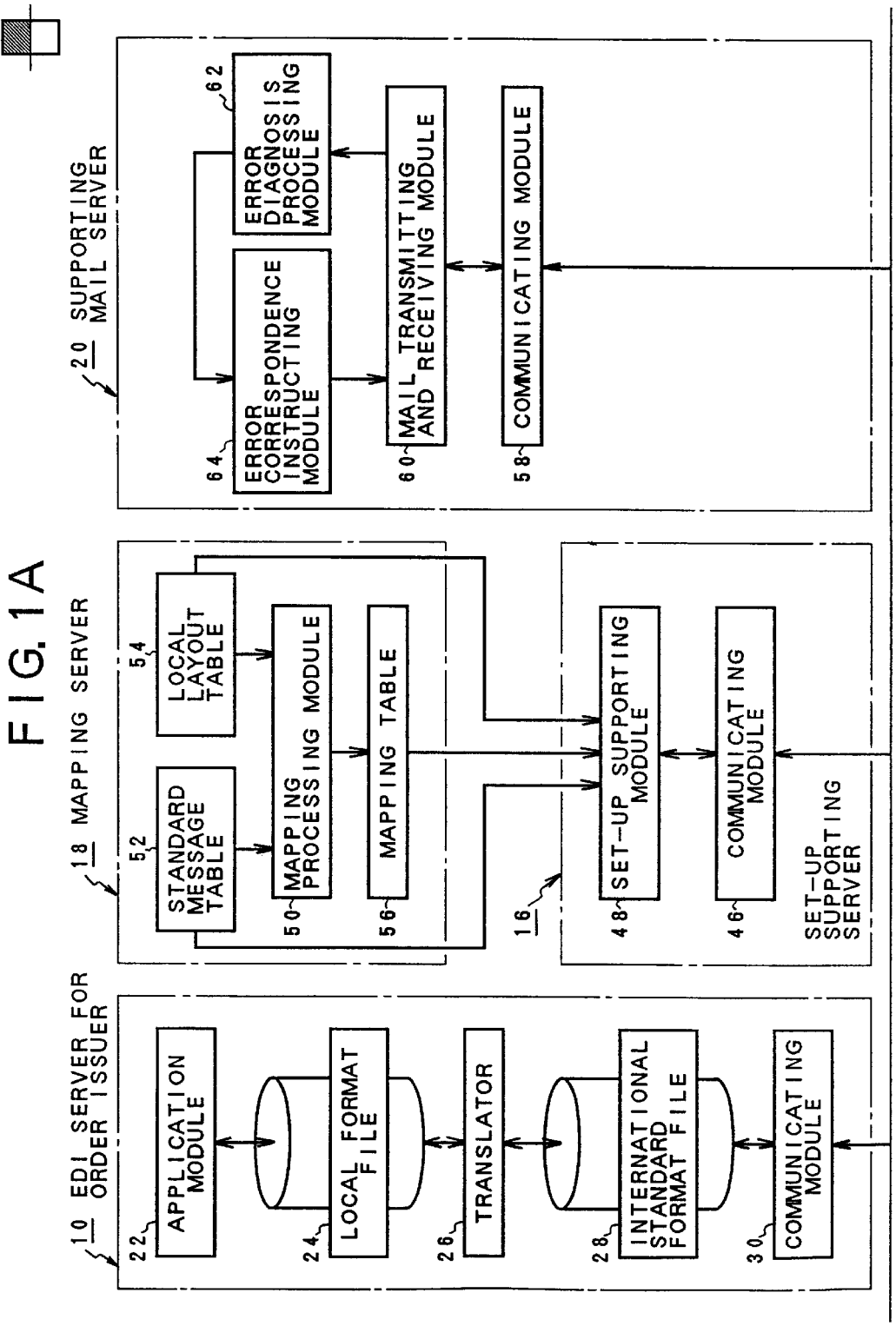

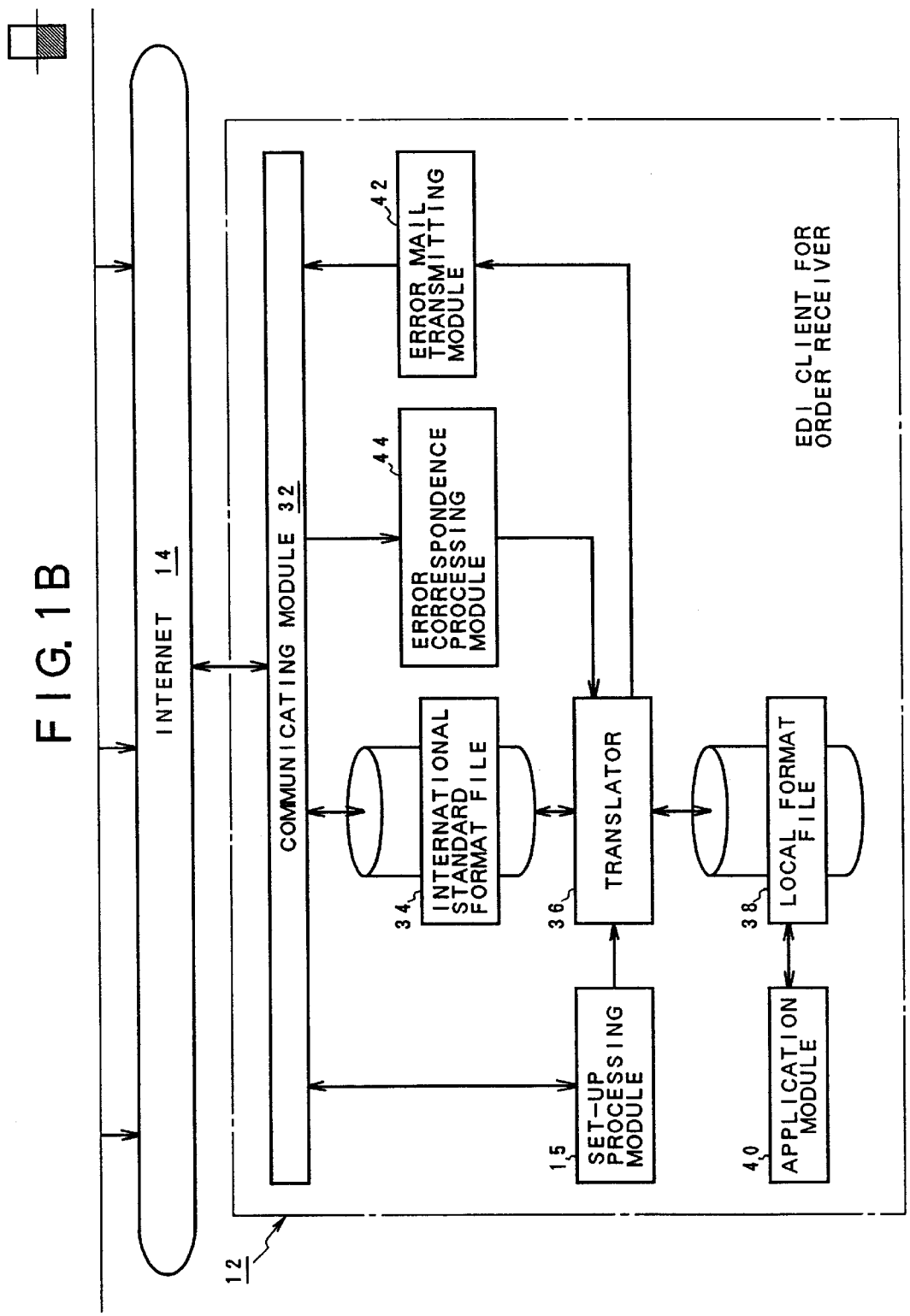

FIG. 3

| ID 124 | COMPANY CODE 126 | CUSTOMER CODE 128 | USING PLATFORM 130 | EXECUTION RESULT 132 | NOTIFICATION DATE/TIME 134 |
|---|---|---|---|---|---|
| 1 | ITOY001 | ITOYE01 | WINDOWS NT | 0 | 1997/1112/1530 |
| 2 | FUJITSU | ITOYE01 | WINDOWS 95 | 99 | 1997/1109/1230 |
| 3 | FKT | ITOYE01 | WINDOWS NT | 0 | 1997/1110/1630 |
| 4 | IWAMOTO | ITOYE01 | WINDOWS 95 | | |
| 5 | FUJITA | ITOYE01 | WINDOWS 95 | | |

| PROCESSING No. | NUMBER NAME | TRANSMISSION AND RECEPTION FLAG | DIRECTORY CODE |
|---|---|---|---|
| 0010 | TOYSRUS (RECEPTION) | 1 | D93A |
| 0020 | TOYSRUS (TRANSMISSION) | 0 | D93A |

| COMPANY CODE | CUSTOMER CODE | STANDARD FILE NAME | STANDARD FILE OUTPUT |
|---|---|---|---|
| STOZW01 | ITOYE01 | C:\toysrus\order's\toyorder.msg | N |
| STOZW01 | ITOYE01 | C:\toysrus\desadv\toydesad.MSG | N |

| PROCESSING No. 152 | SEQUENCE No. 154 | MAPPING CODE 156 | GROUPING FLAG 158 |
|---|---|---|---|
| 0010 | 1 | ORDERS01 | N |
| 0020 | 1 | DESADV01 | 0 |

| LOCAL FILE NAME 160 | OUTPUT MODE 162 | LOCAL RECORD LENGTH 164 |
|---|---|---|
| C:￥toysrus￥orders￥toyorder.txt | N | 00000000 |
| C:￥toysrus￥desadv￥toydesad.txt | | 00000000 |

FIG. 7A

| MAPPING CODE | MP SEQUENCE No. | MAPPING NAME | DIRECTORY CODE | RECORD LAYOUT CODE |
|---|---|---|---|---|
| PRICAT09 | 00001 | PRICAT:FJ,SAISON | D93A | PRICAT01 |
| PRICAT09 | 00002 | PRICAT:FJ,SAISON | D93A | PRICAT01 |
| PRICAT09 | 00003 | PRICAT:FJ,SAISON | D93A | PRICAT01 |
| PRICAT09 | 00004 | PRICAT:FJ,SAISON | D93A | PRICAT01 |
| PRICAT09 | 00005 | PRICAT:FJ,SAISON | D93A | PRICAT01 |
| PRICAT09 | 00006 | PRICAT:FJ,SAISON | D93A | PRICAT01 |
| PRICAT09 | 00007 | PRICAT:FJ,SAISON | D93A | PRICAT01 |
| PRICAT09 | 00008 | PRICAT:FJ,SAISON | D93A | PRICAT01 |
| PRICAT09 | 00009 | PRICAT:FJ,SAISON | D93A | PRICAT01 |
| PRICAT09 | 00010 | PRICAT:FJ,SAISON | D93A | PRICAT01 |
| PRICAT09 | 00011 | PRICAT:FJ,SAISON | D93A | PRICAT01 |
| PRICAT09 | 00012 | PRICAT:FJ,SAISON | D93A | PRICAT01 |
| PRICAT09 | 00013 | PRICAT:FJ,SAISON | D93A | PRICAT01 |
| PRICAT09 | 00014 | PRICAT:FJ,SAISON | D93A | PRICAT01 |
| PRICAT09 | 00015 | PRICAT:FJ,SAISON | D93A | PRICAT01 |
| PRICAT09 | 00016 | PRICAT:FJ,SAISON | D93A | PRICAT01 |
| PRICAT09 | 00017 | PRICAT:FJ,SAISON | D93A | PRICAT01 |
| PRICAT09 | 00018 | PRICAT:FJ,SAISON | D93A | PRICAT01 |
| PRICAT09 | 00019 | PRICAT:FJ,SAISON | D93A | PRICAT01 |
| PRICAT09 | 00020 | PRICAT:FJ,SAISON | D93A | PRICAT01 |
| PRICAT09 | 00021 | PRICAT:FJ,SAISON | D93A | PRICAT01 |
| PRICAT09 | 00022 | PRICAT:FJ,SAISON | D93A | PRICAT01 |
| PRICAT09 | 00023 | PRICAT:FJ,SAISON | D93A | PRICAT01 |
| PRICAT09 | 00024 | PRICAT:FJ,SAISON | D93A | PRICAT01 |
| PRICAT09 | 00043 | PRICAT:FJ,SAISON | D93A | PRICAT01 |
| PRICAT09 | 00044 | PRICAT:FJ,SAISON | D93A | PRICAT01 |
| PRICAT09 | 00045 | PRICAT:FJ,SAISON | D93A | PRICAT01 |
| PRICAT09 | 00046 | PRICAT:FJ,SAISON | D93A | PRICAT01 |
| PRICAT09 | 00047 | PRICAT:FJ,SAISON | D93A | PRICAT01 |
| PRICAT09 | 00048 | PRICAT:FJ,SAISON | D93A | PRICAT01 |
| PRICAT09 | 00049 | PRICAT:FJ,SAISON | D93A | PRICAT01 |
| PRICAT09 | 00050 | PRICAT:FJ,SAISON | D93A | PRICAT01 |
| PRICAT09 | 00055 | PRICAT:FJ,SAISON | D93A | PRICAT01 |
| PRICAT09 | 00056 | PRICAT:FJ,SAISON | D93A | PRICAT01 |
| PRICAT09 | 00057 | PRICAT:FJ,SAISON | D93A | PRICAT01 |
| PRICAT09 | 00058 | PRICAT:FJ,SAISON | D93A | PRICAT01 |
| PRICAT09 | 00059 | PRICAT:FJ,SAISON | D93A | PRICAT01 |
| PRICAT09 | 00060 | PRICAT:FJ,SAISON | D93A | PRICAT01 |
| PRICAT09 | 00061 | PRICAT:FJ,SAISON | D93A | PRICAT01 |

FIG. 7B

| MESSAGE CODE | SEGMENT/ELEMENT ATTRIBUTE | SEGMENT/ELEMENT CODE | LEVEL No. |
|---|---|---|---|
| 186 | 188 | 190 | 192 |
| PRICA3 | S | UNB | 01 |
| PRICA3 | C | S001 | 02 |
| PRICA3 | E | 0001 | 03 |
| PRICA3 | E | 0002 | 03 |
| PRICA3 | C | S002 | 02 |
| PRICA3 | E | 0004 | 03 |
| PRICA3 | E | 0007 | 03 |
| PRICA3 | E | 0008 | 03 |
| PRICA3 | C | S003 | 02 |
| PRICA3 | E | 0010 | 03 |
| PRICA3 | E | 0007 | 03 |
| PRICA3 | E | 0014 | 03 |
| PRICA3 | C | S004 | 02 |
| PRICA3 | E | 0017 | 03 |
| PRICA3 | E | 0019 | 03 |
| PRICA3 | E | 0020 | 02 |
| PRICA3 | C | S005 | 02 |
| PRICA3 | E | 0022 | 03 |
| PRICA3 | E | 0025 | 03 |
| PRICA3 | E | 0026 | 02 |
| PRICA3 | E | 0029 | 02 |
| PRICA3 | E | 0031 | 02 |
| PRICA3 | E | 0032 | 02 |
| PRICA3 | E | 0035 | 02 |
| PRICA3 | S | UNH | 01 |
| PRICA3 | E | 0062 | 02 |
| PRICA3 | C | S009 | 02 |
| PRICA3 | E | 0065 | 03 |
| PRICA3 | E | 0052 | 03 |
| PRICA3 | E | 0054 | 03 |
| PRICA3 | E | 0051 | 03 |
| PRICA3 | E | 0057 | 03 |
| PRICA3 | S | BGM | 01 |
| PRICA3 | C | C002 | 02 |
| PRICA3 | E | 1001 | 03 |
| PRICA3 | E | 1131 | 03 |
| PRICA3 | E | 3055 | 03 |
| PRICA3 | E | 1000 | 03 |
| PRICA3 | E | 1004 | 02 |

| MAX REPEAT COUNT 194 | MIN NUMBER OF DIGITS 196 | MAX NUMBER OF DIGITS 198 | ATTRIBUTE 200 |
|---|---|---|---|
| 00000001 | 0000 | 0000 | |
| 00000001 | | | |
| 00000001 | 0000 | 0004 | A |
| 00000001 | 0000 | 0001 | N |
| 00000001 | | | |
| 00000001 | 0000 | 0035 | AN |
| 00000001 | 0000 | 0004 | AN |
| 00000001 | 0000 | 0014 | AN |
| 00000001 | | | |
| 00000001 | 0000 | 0035 | AN |
| 00000001 | 0000 | 0004 | AN |
| 00000001 | 0000 | 0014 | AN |
| 00000001 | | | |
| 00000001 | 0000 | 0006 | N |
| 00000001 | 0000 | 0004 | N |
| 00000001 | 0000 | 0014 | AN |
| 00000001 | | | |
| 00000001 | 0000 | 0014 | AN |
| 00000001 | 0000 | 0002 | AN |
| 00000001 | 0000 | 0014 | AN |
| 00000001 | 0000 | 0001 | A |
| 00000001 | 0000 | 0001 | N |
| 00000001 | 0000 | 0035 | AN |
| 00000001 | 0000 | 0001 | N |
| 00000001 | 0000 | 0000 | |
| 00000001 | 0000 | 0014 | AN |
| 00000001 | | | |
| 00000001 | 0000 | 0006 | AN |
| 00000001 | 0000 | 0003 | N |
| 00000001 | 0000 | 0003 | N |
| 00000001 | 0000 | 0002 | AN |
| 00000001 | 0000 | 0006 | AN |
| 00000001 | 0000 | 0000 | |
| 00000001 | | | |
| 00000001 | 0000 | 0003 | AN |
| 00000001 | 0000 | 0003 | AN |
| 00000001 | 0000 | 0003 | AN |
| 00000001 | 0000 | 0035 | AN |
| 00000001 | 0000 | 0035 | AN |

| EDITING METHOD | MAX REPEAT COUNT GRP | SEQUENCE No. | LAYOUT OFFSET | LAYOUT LENGTH |
|---|---|---|---|---|
| | 00000001 | | 0000000001 | 00000000 |
| | 00000001 | | 0000000001 | 00000000 |
| YL | 00000001 | | | |
| MY | 00000001 | | | |
| | 00000001 | | 0000000001 | 00000000 |
| YL | 00000001 | 00007 | 0000000001 | 00000013 |
| | 00000001 | | 0000000001 | 00000000 |
| | 00000001 | | 0000000001 | 00000000 |
| | 00000001 | | 0000000001 | 00000000 |
| YL | 00000001 | 00006 | 0000000001 | 00000013 |
| | 00000001 | | 0000000001 | 00000000 |
| | 00000001 | | 0000000001 | 00000000 |
| | 00000001 | | 0000000001 | 00000000 |
| MY | 00000001 | | | |
| MY | 00000001 | | | |
| YL | 00000001 | | | |
| | 00000001 | | 0000000001 | 00000000 |
| | 00000001 | | 0000000001 | 00000000 |
| | 00000001 | | 0000000001 | 00000000 |
| | 00000001 | | 0000000001 | 00000000 |
| | 00000001 | | 0000000001 | 00000000 |
| | 00000001 | | 0000000001 | 00000000 |
| YL | 00000001 | | | |
| MY | 00000001 | | | |
| | 00000001 | | 0000000001 | 00000000 |
| YL | 00000001 | | | |
| | 00000001 | | 0000000001 | 00000000 |
| YL | 00000001 | | | |
| MY | 00000001 | | | |
| MY | 00000001 | | | |
| YL | 00000001 | | | |
| YL | 00000001 | | | |
| | 00000001 | | 0000000001 | 00000000 |
| | 00000001 | | 0000000001 | 00000000 |
| YL | 00000001 | | | |
| | 00000001 | | 0000000001 | 00000000 |
| | 00000001 | | 0000000001 | 00000000 |
| | 00000001 | | 0000000001 | 00000000 |
| | 00000001 | | 0000000001 | 00000000 |

| COMPANY | CUSTOMER | QSE AREA | COMPILE FLAG | INEVITABLE FLAG |
|---|---|---|---|---|
| | | | 1 | M |
| | | | 1 | M |
| | | @SYSSYNTAX | 1 | M |
| | | 2 | 1 | |
| | | | 1 | M |
| 1 | 0 | ORDER RECEIVER ENTERPRISE CODE | 1 | M |
| | | | 1 | C |
| | | | 1 | C |
| | | | 1 | M |
| 0 | 1 | ORDER ISSUER ENTERPRISE CODE | 1 | M |
| | | | 1 | C |
| | | | 1 | C |
| | | | 1 | M |
| | | @SYSDATE6 | 1 | |
| | | @SYSTIME4 | 1 | |
| | | ECR9710 | 1 | |
| | | | 1 | C |
| | | | 1 | M |
| | | | 1 | C |
| | | | 1 | C |
| | | | 1 | C |
| | | | 1 | C |
| | | EANCOM | 1 | |
| | | 1 | 1 | |
| | | | 1 | M |
| | | @SYSSEQ | 1 | |
| | | | 1 | M |
| | | @SYSMSG | 1 | M |
| | | @SYSVER | 1 | |
| | | @SYSREL | 1 | |
| | | UN | 1 | |
| | | EAN005 | 1 | |
| | | | 1 | |
| | | | 1 | |
| | | 9 | 1 | |
| | | | 1 | |
| | | | 1 | |
| | | | 1 | |
| | | | 1 | |

FIG. 8A

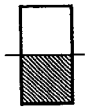

| RECORD LAYOUT CODE | SEQ | RECORD LAYOUT NAME | MODE | SEQ NAME |
|---|---|---|---|---|
| PRICAT01 | 00001 | D93A PRICAT(JEDICOS) | 1 | TRANSMISSION PARTNER DESTINATION CODE |
| PRICAT01 | 00002 | D93A PRICAT(JEDICOS) | 1 | TRANSMISSION DATE |
| PRICAT01 | 00003 | D93A PRICAT(JEDICOS) | 1 | DATA PROCESSING No. |
| PRICAT01 | 00004 | D93A PRICAT(JEDICOS) | 1 | MESSAGE NAME |
| PRICAT01 | 00005 | D93A PRICAT(JEDICOS) | 1 | ACTION REQUEST CODE |
| PRICAT01 | 00006 | D93A PRICAT(JEDICOS) | 1 | ORDER ISSUER ENTERPRISE CODE |
| PRICAT01 | 00007 | D93A PRICAT(JEDICOS) | 1 | ORDER RECEIVER ENTERPRISE CODE |
| PRICAT01 | 00008 | D93A PRICAT(JEDICOS) | 1 | ORDER RECEIVER ENTERPRISE NAME |
| PRICAT01 | 00009 | D93A PRICAT(JEDICOS) | 1 | JAN CODE |
| PRICAT01 | 00010 | D93A PRICAT(JEDICOS) | 1 | JICFS CLASSIFICATION CODE |
| PRICAT01 | 00011 | D93A PRICAT(JEDICOS) | 1 | MAKER CODE |
| PRICAT01 | 00012 | D93A PRICAT(JEDICOS) | 1 | SIZE (WIDTH mm) OF PRODUCT |
| PRICAT01 | 00013 | D93A PRICAT(JEDICOS) | 1 | SIZE (HEIGHT mm) OF PRODUCT |
| PRICAT01 | 00014 | D93A PRICAT(JEDICOS) | 1 | SIZE (DEPTH mm) OF PRODUCT |
| PRICAT01 | 00015 | D93A PRICAT(JEDICOS) | 1 | POSITION OF PUNCHING HOLE X |
| PRICAT01 | 00016 | D93A PRICAT(JEDICOS) | 1 | POSITION OF PUNCHING HOLE Y |
| PRICAT01 | 00017 | D93A PRICAT(JEDICOS) | 1 | KATAKANA NAME OF PRODUCT |
| PRICAT01 | 00018 | D93A PRICAT(JEDICOS) | 1 | ABBREVIATION NAME OF PRODUCT |
| PRICAT01 | 00019 | D93A PRICAT(JEDICOS) | 1 | PRODUCT NAME |
| PRICAT01 | 00020 | D93A PRICAT(JEDICOS) | 1 | DESIRED SALE PRICE |
| PRICAT01 | 00021 | D93A PRICAT(JEDICOS) | 1 | SALE PRICE |
| PRICAT01 | 00022 | D93A PRICAT(JEDICOS) | 1 | COST PRICE |
| PRICAT01 | 00023 | D93A PRICAT(JEDICOS) | 1 | STANDARD UNIT |
| PRICAT01 | 00024 | D93A PRICAT(JEDICOS) | 1 | STANDARD |
| PRICAT01 | 00025 | D93A PRICAT(JEDICOS) | 1 | DATE OF SALE |
| PRICAT01 | 00026 | D93A PRICAT(JEDICOS) | 1 | FINAL DATE OF SALE |
| PRICAT01 | 00027 | D93A PRICAT(JEDICOS) | 1 | REGISTRATION DATE |
| PRICAT01 | 00028 | D93A PRICAT(JEDICOS) | 1 | UPDATING DATE |
| PRICAT01 | 00029 | D93A PRICAT(JEDICOS) | 1 | INPUT NUMBER (ORDER ISSUING UNIT) |
| PRICAT01 | 00030 | D93A PRICAT(JEDICOS) | 1 | OVERLAP FORMAT CODE |

FIG. 9A

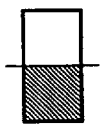

54

| RECORD LAYOUT CODE | SEQ | RECORD LAYOUT NAME | MODE | SEQ NAME |
|---|---|---|---|---|
| PRICAT01 | 00031 | D93A PRICAT(JEDICOS) | 1 | OVERLAP SIZE |
| PRICAT01 | 00032 | D93A PRICAT(JEDICOS) | 1 | COMPRESSION RATIO |
| PRICAT01 | 00033 | D93A PRICAT(JEDICOS) | 1 | ITF CODE |
| PRICAT01 | 00034 | D93A PRICAT(JEDICOS) | 1 | PRODUCT CODE OF ORDER ISSUER ENTERPRISE |
| PRICAT01 | 00035 | D93A PRICAT(JEDICOS) | 1 | STYLE No. |
| PRICAT01 | 00036 | D93A PRICAT(JEDICOS) | 1 | COLOR CODE |
| PRICAT01 | 00037 | D93A PRICAT(JEDICOS) | 1 | ITEM NAME ON RECEIPT |
| PRICAT01 | 00038 | D93A PRICAT(JEDICOS) | 1 | PRODUCT COMMENT (SELLING METHOD) |
| PRICAT01 | 00039 | D93A PRICAT(JEDICOS) | 1 | DISPLAY UNT (CONTENT AMOUNT UNIT NAME) |
| PRICAT01 | 00040 | D93A PRICAT(JEDICOS) | 1 | CONTRACT QUANTITY |
| PRICAT01 | 00041 | D93A PRICAT(JEDICOS) | 1 | ORDER ISSUE SCHEDULED QUANTITY OF THE FIRST TIME 1 |
| PRICAT01 | 00042 | D93A PRICAT(JEDICOS) | 1 | ORDER ISSUE SCHEDULED QUANTITY OF THE FIRST TIME 2 |
| PRICAT01 | 00043 | D93A PRICAT(JEDICOS) | 1 | ORDER ISSUE SCHEDULED QUANTITY OF THE FIRST TIME 3 |
| PRICAT01 | 00044 | D93A PRICAT(JEDICOS) | 1 | PLANNING START DATE |
| PRICAT01 | 00045 | D93A PRICAT(JEDICOS) | 1 | PLANNING END DATE |
| PRICAT01 | 00046 | D93A PRICAT(JEDICOS) | 1 | MASTER DELETION SCHEDULED DATE |
| PRICAT01 | 00047 | D93A PRICAT(JEDICOS) | 1 | END DATE OF DELIVERY SCHEDULED TERM |
| PRICAT01 | 00048 | D93A PRICAT(JEDICOS) | 1 | START DATE OF DELIVERY SCHEDULED TERM |
| PRICAT01 | 00049 | D93A PRICAT(JEDICOS) | 1 | END DATE OF ORDER ISSUE |
| PRICAT01 | 00050 | D93A PRICAT(JEDICOS) | 1 | WEIGHT OF CARTON BOX (kg) (CASING QUANTITY) |
| PRICAT01 | 00051 | D93A PRICAT(JEDICOS) | 1 | WEIGHT OF PRODUCT (kg) (PER PRODUCT) |

| 232 | 234 | 236 | 238 | 240 | 242 | 244 |
|---|---|---|---|---|---|---|
| RECORD LEVEL No. | REPEAT COUNT | ATTRIBUTE | START POSITION | THE NUMBER OF DIGITS | COMPANY | CUSTOMER |
| 1 | 00000001 | R | 0000000343 | 00000003 | | |
| 1 | 00000001 | R | 0000000346 | 00000002 | | |
| 1 | 00000001 | AN | 0000000348 | 00000016 | | |
| 1 | 00000001 | AN | 0000000364 | 00000030 | | |
| 1 | 00000001 | AN | 0000000394 | 00000013 | | |
| 1 | 00000001 | AN | 0000000407 | 00000012 | | |
| 1 | 00000001 | AN | 0000000419 | 00000024 | | |
| 1 | 00000001 | AN | 0000000443 | 00000070 | | |
| 1 | 00000001 | AN | 0000000513 | 00000006 | | |
| 1 | 00000001 | R | 0000000519 | 00000010 | | |
| 1 | 00000001 | R | 0000000529 | 00000006 | | |
| 1 | 00000001 | R | 0000000535 | 00000006 | | |
| 1 | 00000001 | R | 0000000541 | 00000006 | | |
| 1 | 00000001 | AN | 0000000547 | 00000008 | | |
| 1 | 00000001 | AN | 0000000555 | 00000008 | | |
| 1 | 00000001 | AN | 0000000563 | 00000008 | | |
| 1 | 00000001 | AN | 0000000571 | 00000008 | | |
| 1 | 00000001 | AN | 0000000579 | 00000008 | | |
| 1 | 00000001 | AN | 0000000587 | 00000008 | | |
| 1 | 00000001 | R | 0000000595 | 00000003 | | |
| 1 | 00000001 | R | 0000000598 | 00000005 | | |

FIG. 10A

pritest2.out
78-1

```
UNB+UNOX:2+FJ+490660000000000+971029:1013+ECR9710+++++EANCOM+1'
UNH+1+PRICAT:D:93A:UN:EAN005'
BGM+9++1'
DTM+JD6:199710111:102'
NAD+SU+4906654000000000::9++ ORDER RECEIVER ENTERPRISE NAME AAA'
PGI+2+:4906654000000000'
NAD+BY+490123000000000::9'
PIT+1+1'
PIA+5+4902710000000:EN::9'
PIA+1+1234567890:ACU::251+1234567890:BP::92+123456789:
GN::251+111-111111111:PU::91'
IMD+F+35+::22-2222222222222'
IMD+F+JS2+::1000:ML'
IMD+F+JS3+::::MEIJI MILK::$BL@<#·(J ·$B5mF}·(J'
IMD+F+JSD+::::ABCDEFGHIJKLMNOPQRSTUVWX::$B>&IJC;=LL>>N·(J'
IMD+F+JSC+::::27050001'
IMD+F+JSH+::::LLLLLL'
MEA+PD+DP+MMT:71'
MEA+PD+HT+MMT:235'
MEA+PD+WD+MMT:71'
MEA+PD+JM2+KGM:111'
MEA+PD+JM3+MMT:30'
MEA+PD+JM4+MMT:50'
MEA+AAC+KG:99999'
QTY+52:1'
QTY+JQ1:123456789 0'
QTY+JQ2:123456'
QTY+JQ3:123456'
QTY+JQ4:123456'
```

FIG. 10B

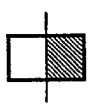

```
DTM+7:19930511:102'
DTM+15::19950531:102'
DTM+16::20000531:102'
DTM+36::20000601::102'
DTM+63::20000501::102'
DTM+84::19950601::102'
DTM+151::19960427::102'
DTM+263::19950601::102'
DTM+JD1::19970624::102'
DTM+21E::20000905:102'
FTX+PRD+1+J11+SSSSSSSSSSSSSSSSSSSSSSSSSSSSSSSSSSSSSSSSSSSSSSSSSSSSSSS
SSSSSSSSSS'
PRI+AAA:1::LIU'
PRI+AAA:654321:::RTP'
PRI+AAA:123456:::SRE'
UNT++42+1'
UNH+2+PRICAT:D:93A:UN:EAN005'
BGM+9++1'
DTM+JD6:199710111::102'
NAD+SU+490654000000000:::9++ ORDER RECEIVER ENTERPRISE NAME AAA'
PGI++2+:4906540000000'
NAD+BY+490123000000:::9'
PIT++2+1'
PIA+5+490271000000000:EN::9'
PIA+1+12345678:ACU::251+123456789-123456789-1234567890:BP::92+123456789:
GN:::251+111-1111111:PU::91'
IMD++F+35+:::22-22222222'
```

```
                                        Pritest2.txt
4906600000000019971011000001PRICAT14901230000000049065400000000 ORDER RECEIVER
ENTERPRISE NAME AAA         4902710000012345678927050001  71 235 71 30  MEIJI
50MEIJI MILK                ABBREVIATION NAME OF PRODUCT
MILK        1ML             1000199604272000000905199305111997062412  0
12345665432 1
0123456789
123456789-123456789-1111111122-2222222222ABCDEFGHIJKLMNOPQR
STUVWXSSSSSSSSSSSSSSSSSSSSSSSSSSSSSSSSSSSSSSSSSSSSSSSSSSSSSSS
SSSLLLLL123456123456199505312000006012000050011995
060119950601111999999
```

FIG. 13

EXECUTION LOG/ERROR REFERENCE PICTURE PLANE — 96-1

CANCEL | LOG PRINT | ERROR PRINT

EXECUTION RESULT | ERROR CONTENTS | BINARY LOG

| COMPANY CODE | CUSTOMER CODE | REFERENCE VERSION | REFERENCE RELEASE | MESSAGE CODE | THE NUMBER OF INPUT ITEMS | THE NUMBER OF OUTPUT ITEMS | RESULT |
|---|---|---|---|---|---|---|---|
| STOZW01 | ITOYE01 | D | 93A | DESADV | 000001 | 000001 | NORMAL |

246 — 248 — 250 — 252 — 254 — 256 — 258 — 260

Esc:CANCEL

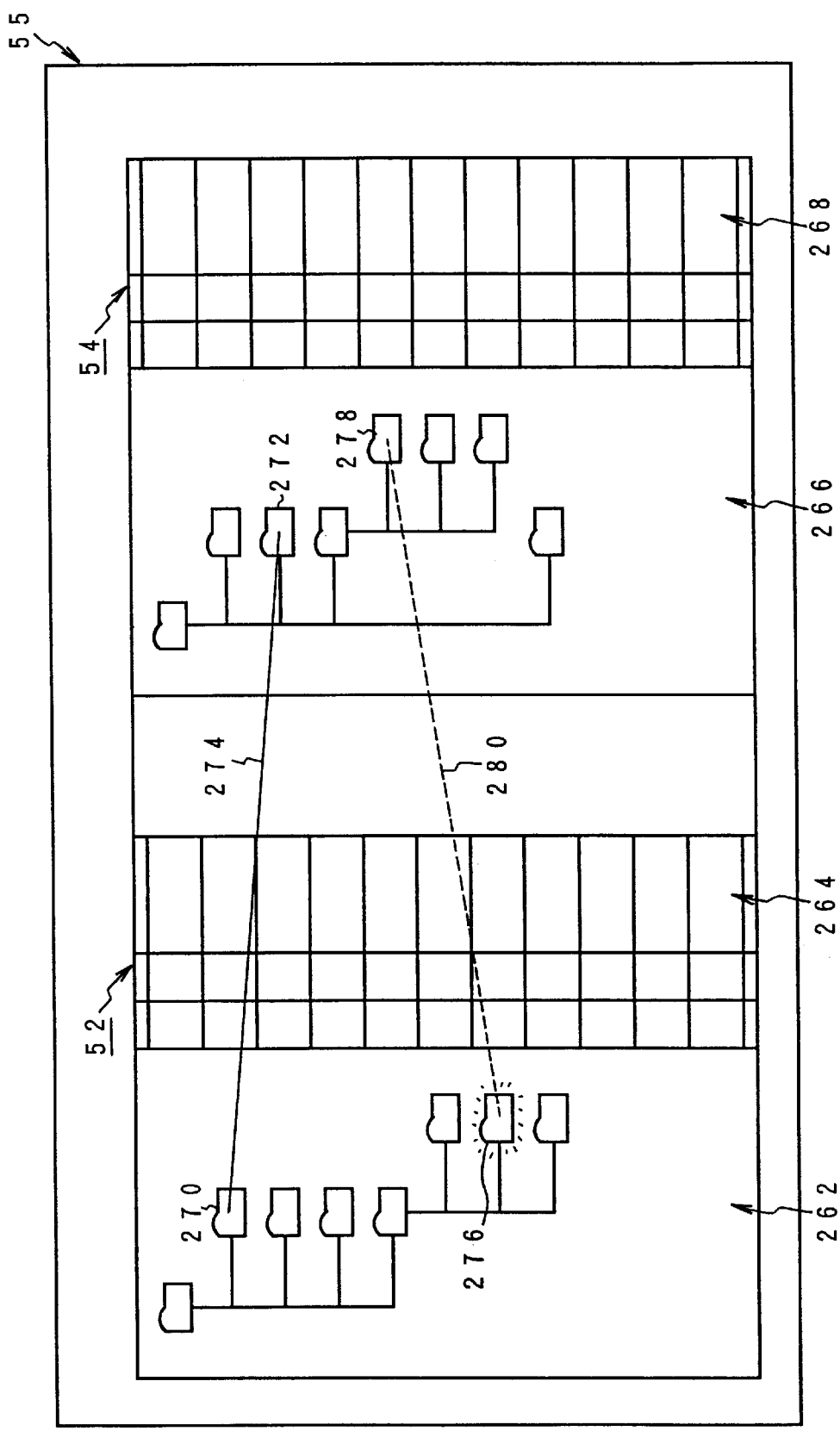

| CLASSIFI-CATION | MESSAGE TAG | DEFINITION OF MESSAGE CODE FUNCTION |
|---|---|---|
| ORDER RECEIVING/ISSUING RELATION | INVOIC (Commercial Invoice) | (R.527/Rev.1) MESSAGE FOR DEMANDING PAYMENT FOR ARTICLES OR SERVICES SUPPLIED UNDER TERMS AGREED BETWEEN SELLER AND BUYER. UN STANDARD INVOICE MESSAGE FUNCTIONS ALSO AS SPECIFICATIONS FOR Debit Note MESSAGE AND Credit Note MESSAGE BY PROVIDING WITH PROPER DATA. "INVOICE" IN UNSMs DOCUMENT (R.527) IS CONSTRUED TO HAVE EXTENSIVE MEANING OF "Invoice/Credit Note/Debit Note". |
| | ORDERS (Purchase Order) | (R.588&Corr.1) MESSAGE SPECIFYING DETAILS ABOUT ARTICLES AND SERVICES ORDERED UNDER TERMS AGREED BETWEEN SELLER AND BUYER. |
| | ORDCHG (Purchase Order Change) | (R.741) MESSAGE FROM BUYER FOR TRANSMITTING TO SELLER THE CONTENT OF BUYER'S PURCHASE ORDER CHANGE REQUEST IN DETAIL. |
| | ORDRSP (Purchase Order Response) | (R.741) MESSAGE FROM SELLER TO BUYER, WHICH ANSWERS Purchase Order MESSAGE OR Perchase Order Change REQUEST MESSAGE. |
| | PARTIN (Party Information) | (R.741) MESSAGE ENABLING TRANSMISSION OF FUNDAMENTAL INFORMATION ABOUT DATA UPON LOCATION, RELATED USE, MANAGEMENT, FINANCIAL AFFAIRS, MANUFACTURE AND TRANSACTION. |
| | PRICAT (Price/Sales Catalogue) | (R.741) MESSAGE ENABLING TRANSMISSION OF INFORMATION ABOUT PRICES OF ARTICLES OR SERVICES AND SPECIFICATION OF CATALOGS, SUPPLIED FROM SELLER TO BUYER. |

FIG.19

| CLASSIFICATION | MESSAGE TAG | DEFINITION OF MESSAGE CODE FUNCTION |
|---|---|---|
| ORDER RECEIVING /ISSUING RELATIONSHIP | QALITY (Quality Data) | MESSAGE FOR TRANSMITTING RESULTS OF TESTS PERFORMED TO SATISFY REQUIREMENTS OF SPECIFIED PRODUCTS OR PROCESSING, THE CONTENT OF WHICH INCLUDES THE FOLLOWINGS, BUT IS NOT LIMITED TO THOSE: TEST DATA AND MEASUREMENT CAPACITY, etc., STATISTICAL INFORMATION, TEST METHOD USED. (R.583) |
| | QUOTES (Quotation) | MESSAGE IMPARTING TO SELLER THE ABILITY TO PRESENT PRICES, DELIVERY SCHEDULE AND OTHER TERMS FOR SELLING ARTICLES OR SERVICES. (R.741) |
| | REQOTE (Request for Quote) | MESSAGE IMPARTING TO BUYER THE ABILITY TO REQUEST THE PRESENTATION OF PRICES, DELIVERY SCHEDULES AND OTHER TERMS OF SELLER OF ARTICLES OR SERVICES. (R.741) |
| | SLSRPT (Sales Data Report) | MESSAGE ENABLING TRANSMISSION OF SALES DATA ABOUT PRODUCES OR SERVICES, SUCH AS LOCATION CONCERNED, PERIOD, PRODUCT CHECK, PRICES, AMOUNT OF MONEY, QUANTITY, INFORMATION ON VARIOUS MARKETING FIELDS, AND BUYING AND SELLING PARTIES CONCERNED, THE MESSAGE ALLOWING RECEIVER TO AUTOMATICALLY PROCESS INFORMATION AND TO USE IT FOR THE PURPOSE OF PRODUCTS, PLANNING, MARKETING, STATISTICS, etc. (R.742) |
| | STATAC (Statement of Account) | MESSAGE FROM SELLER OR THE AGENT TO BUYER OF THE AGENT, PRESENTING INFORMATION ABOUT ACCOUNTING STATUS AT A SPECIFIC POINT OF TIME, THE MESSAGE BEING USED IN AID OF MEDIATION/COMPROMISE AND SERVING ALSO AS LETTER ASKING FOR PAYMENT OF ACCOUNT. (R.741) |
| | ORDINQ (Order Status Enquiry) ORDSTA (Order Status) PRDSPE (Product Specification) | |

FIG. 20

| CLASSIFI-CATION | MESSAGE TAG | DEFINITION OF MESSAGE CODE FUNCTION |
|---|---|---|
| ARTICLES /MANAGEMENT | DELFOR (Delivery Schedule) | (R.711) MESSAGE IMPARTING FROM BUYER TO SUPPLIER THE INFORMATION ABOUT DETAILS OF BOTH SHORT-TERM DELIVERY INSTRUCTION IN ACCORDANCE WITH TERMS INSTRUCTED IN CONTRACT OR ORDER SHEET AND MIDIUM OR LONG-TERM REQUIREMENTS ABOUT PRODUCTS FOR PLANNED PURPOSES, THE MESSAGE BEING USED ALSO AS APPROVAL OF REFERRING HUMAN AND MATERIAL RESOURCES. |
| | DELJIT (Just-in-time Delivery) | (R.712) MESSAGE TRANSMITTING TO CLIENT CORRECT DELIVERY SEQUENCE AND REQUIREMENTS OF JUST-IN-TIME SCHEDULES FOR THE SUPPLIER, THE MESSAGE SERVING TO SUPPLEMENT STANDARD MESSAGE DELFOR (ABOVE DESCRIBED). |
| | DESADV (Despatch Advice) | (R.713) MESSAGE INFORMING OF DETAILS OF ARTICLES, WHICH HAVE BEEN DISPATCHED OR ARE READY FOR DISPATCH UNDER AGREED TERMS. |
| | INVRPT (Inventory Report) | (R.773) MESSAGE DETAILING INFORMATION RELATING TO INVENTORY, THE MESSAGE BEING USED BY BOTH PARTIES CONCERNED OF TRANSACTION. |
| | DISRPT (Distribution Report) | |

| DIRECTORY | MESSAGE TAG | SEQ | NAME | SEGMENT | SEGMENT CODE | LEVEL | MANDATORY | REPEAT COUNT |
|---|---|---|---|---|---|---|---|---|
| D93A | DESADV | 00001 | Despatch Advice Message | UNH | Message header | 01 | M | 0000000 |
| D93A | DESADV | 00002 | Despatch Advice Message | BGM | Beginning of message | 01 | M | 0000000 |
| D93A | DESADV | 00003 | Despatch Advice Message | DTM | Date/time/period | 01 | C | 0000001 |
| D93A | DESADV | 00004 | Despatch Advice Message | ALI | Additional information | 01 | C | 0000000 |
| D93A | DESADV | 00005 | Despatch Advice Message | MEA | Measurements | 01 | C | 0000000 |
| D93A | DESADV | 00006 | Despatch Advice Message | G01 | Segment Group 1 | 01 | C | 0000001 |
| D93A | DESADV | 00007 | Despatch Advice Message | RFF | Reference | 02 | M | 0000000 |
| D93A | DESADV | 00008 | Despatch Advice Message | DTM | Date/time/period | 02 | C | 0000000 |
| D93A | DESADV | 00009 | Despatch Advice Message | G02 | Segment Group 2 | 01 | C | 0000001 |
| D93A | DESADV | 00010 | Despatch Advice Message | NAD | Name and address | 02 | M | 0000000 |
| D93A | DESADV | 00011 | Despatch Advice Message | LOC | Place/location identific | 02 | C | 0000001 |
| D93A | DESADV | 00012 | Despatch Advice Message | G03 | Segment Group 3 | 02 | C | 0000001 |
| D93A | DESADV | 00013 | Despatch Advice Message | RFF | Reference | 03 | M | 0000000 |
| D93A | DESADV | 00014 | Despatch Advice Message | DTM | Date/time/period | 03 | C | 0000001 |
| D93A | DESADV | 00015 | Despatch Advice Message | G04 | Segment Group 4 | 02 | C | 0000000 |
| D93A | DESADV | 00016 | Despatch Advice Message | CTA | Contact information | 03 | M | 0000000 |
| D93A | DESADV | 00017 | Despatch Advice Message | COM | Communication contact | 03 | C | 0000001 |
| D93A | DESADV | 00018 | Despatch Advice Message | G05 | Segment Group 5 | 01 | C | 0000001 |
| D93A | DESADV | 00019 | Despatch Advice Message | TOD | Terms of delivery | 02 | M | 0000000 |

| DIRECTORY | SEGMENT | SEGMENT CODE NAME | SINGLE COMPOUND ELEMENT | LEVEL | MANDATORY | NAME |
|---|---|---|---|---|---|---|
| D93A | AGR | AGREEMENT IDENTIFICATI | C543 | 01 | C | AGREEMENT TYPE IDENTIFICATION |
| D93A | AGR | AGREEMENT IDENTIFICATI | 7431 | 02 | M | Agreement type qualifier |
| D93A | AGR | AGREEMENT IDENTIFICATI | 7433 | 02 | C | Agreement type, coded |
| D93A | AGR | AGREEMENT IDENTIFICATI | 1131 | 02 | C | Code list qualifier |
| D93A | AGR | AGREEMENT IDENTIFICATI | 3055 | 02 | C | Code list responsible agency, |
| D93A | AGR | AGREEMENT IDENTIFICATI | 7434 | 02 | C | Agreement type description |
| D93A | AGR | AGREEMENT IDENTIFICATI | 9419 | 01 | C | SERVICE LAYER, CODED |
| D93A | AJT | ADJUSTMENT DETAILS | 4465 | 01 | M | ADJUSTMENT REASON, CODED |
| D93A | AJT | ADJUSTMENT DETAILS | 1082 | 01 | C | LINE ITEM NUMBER |
| D93A | ALC | ALLOWANCE OR CHARGE | 5463 | 01 | M | ALLOWANCE OR CHARGE QUALIFIER |
| D93A | ALC | ALLOWANCE OR CHARGE | C552 | 01 | C | ALLOWANCE/CHARGE INFORMATION |
| D93A | ALC | ALLOWANCE OR CHARGE | 1230 | 02 | C | Allowance or charge number |
| D93A | ALC | ALLOWANCE OR CHARGE | 5189 | 02 | C | charge/allowance description, |
| D93A | ALC | ALLOWANCE OR CHARGE | 4471 | 01 | C | SETTLEMENT, CODED |
| D93A | ALC | ALLOWANCE OR CHARGE | 1227 | 01 | C | CALCULATION SEQUENCE INDICATOR |
| D93A | ALC | ALLOWANCE OR CHARGE | C214 | 01 | C | SPECIAL SERVICES IDENTIFICATIO |
| D93A | ALC | ALLOWANCE OR CHARGE | 7161 | 02 | M | Special services, coded |
| D93A | ALC | ALLOWANCE OR CHARGE | 1131 | 02 | C | Code list qualifier |
| D93A | ALC | ALLOWANCE OR CHARGE | 3055 | 02 | C | Code list responsible agency, |
| D93A | ALC | ALLOWANCE OR CHARGE | 7160 | 02 | C | Special service |

| ATTRIBUTE | MINIMUM NUMBER OF DIGITS | MAXIMUM NUMBER OF DIGITS | REPEAT COUNT |
|---|---|---|---|
| AN | 0000 | | 00000001 |
| AN | 0000 | 0003 | 00000001 |
| AN | 0000 | 0003 | 00000001 |
| AN | 0000 | 0003 | 00000001 |
| AN | 0000 | 0070 | 00000001 |
| AN | 0000 | 0003 | 00000001 |
| N | 0000 | 0006 | 00000001 |
| AN | 0000 | 0003 | 00000001 |
| | | | 00000001 |
| AN | 0000 | 0035 | 00000001 |
| AN | 0000 | 0003 | 00000001 |
| AN | 0000 | 0003 | 00000001 |
| AN | 0000 | 0003 | 00000001 |
| AN | 0000 | 0003 | 00000001 |
| AN | 0000 | 0003 | 00000001 |
| AN | 0000 | 0003 | 00000001 |
| AN | 0000 | 0035 | 00000001 |

F I G. 23

364

| DIRECTORY | ELEMENT | NAME | ATTRIBUTE | MINIMUM NUMBER OF DIGITS | MAXIMUM NUMBER OF DIGITS | CODE SET |
|---|---|---|---|---|---|---|
| D93A | 1001 | Document/message name, coded | AN | 0000 | 0003 | 0 |
| D93A | 1004 | Document/message number | AN | 0000 | 0035 | 0 |
| D93A | 1049 | Message section, coded | AN | 0000 | 0003 | 0 |
| D93A | 1050 | Sequence number | | 000 | 000 | 0 |
| D93A | 1052 | Message item number | AN | 0000 | 0035 | 0 |
| D93A | 1054 | Message sub-item number | N | 0000 | 0006 | 0 |
| D93A | 1073 | Document line Indicator, cod | AN | 0000 | 0003 | 0 |
| D93A | 1082 | Line item number | N | 0000 | 0006 | 0 |
| D93A | 1131 | Code list qualifier | AN | 0000 | 0003 | 0 |
| D93A | 1153 | Reference qualifier | AN | 0000 | 0003 | 0 |
| D93A | 1154 | Reference number | AN | 0000 | 0035 | 0 |
| D93A | 1156 | Line number | AN | 0000 | 0006 | 0 |
| D93A | 1159 | Sequence number source, code | AN | 0000 | 0003 | 0 |
| D93A | 1218 | Number of originals of docum | N | 0000 | 0002 | 0 |
| D93A | 1220 | Number of copies of document | N | 0000 | 0002 | 0 |
| D93A | 1222 | Configuration level | N | 0000 | 0002 | 0 |
| D93A | 1225 | Message function, coded | AN | 0000 | 0003 | 0 |
| D93A | 1227 | Calculation sequence indicat | AN | 0000 | 0003 | 0 |

| DIRECTORY | COMPOUND ELEMENT | COMPOUND ELEMENT CODE NAME | SEQUENCE | ELEMENT | ELEMENT CODE NAME |
|---|---|---|---|---|---|
| D93A | C002 | DOCUMENT/MESSAGE NAME | 00001 | 1001 | Document/message name, |
| D93A | C002 | DOCUMENT/MESSAGE NAME | 00002 | 1131 | Code list qualifier |
| D93A | C002 | DOCUMENT/MESSAGE NAME | 00003 | 3055 | Code list responsible |
| D93A | C002 | DOCUMENT/MESSAGE NAME | 00004 | 1000 | Document/message name |
| D93A | C040 | CARRIER | 00001 | 3127 | Carrier identification |
| D93A | C040 | CARRIER | 00002 | 1131 | Code list qualifier |
| D93A | C040 | CARRIER | 00003 | 3055 | Code list responsible |
| D93A | C040 | CARRIER | 00004 | 3128 | Carrier name |
| D93A | C045 | BILL LEVEL IDENTIFICATION | 00001 | 7436 | Level one ID |
| D93A | C045 | BILL LEVEL IDENTIFICATION | 00002 | 7438 | Level two ID |
| D93A | C045 | BILL LEVEL IDENTIFICATION | 00003 | 7440 | Level three ID |
| D93A | C045 | BILL LEVEL IDENTIFICATION | 00004 | 7442 | Level four ID |
| D93A | C045 | BILL LEVEL IDENTIFICATION | 00005 | 7444 | Level five ID |
| D93A | C045 | BILL LEVEL IDENTIFICATION | 00006 | 7446 | Level six ID |
| D93A | C056 | DEPARTMENT OR EMPLOYEE DETA | 00001 | 3413 | Department or employee |
| D93A | C056 | DEPARTMENT OR EMPLOYEE DETA | 00002 | 3412 | Department or employee |

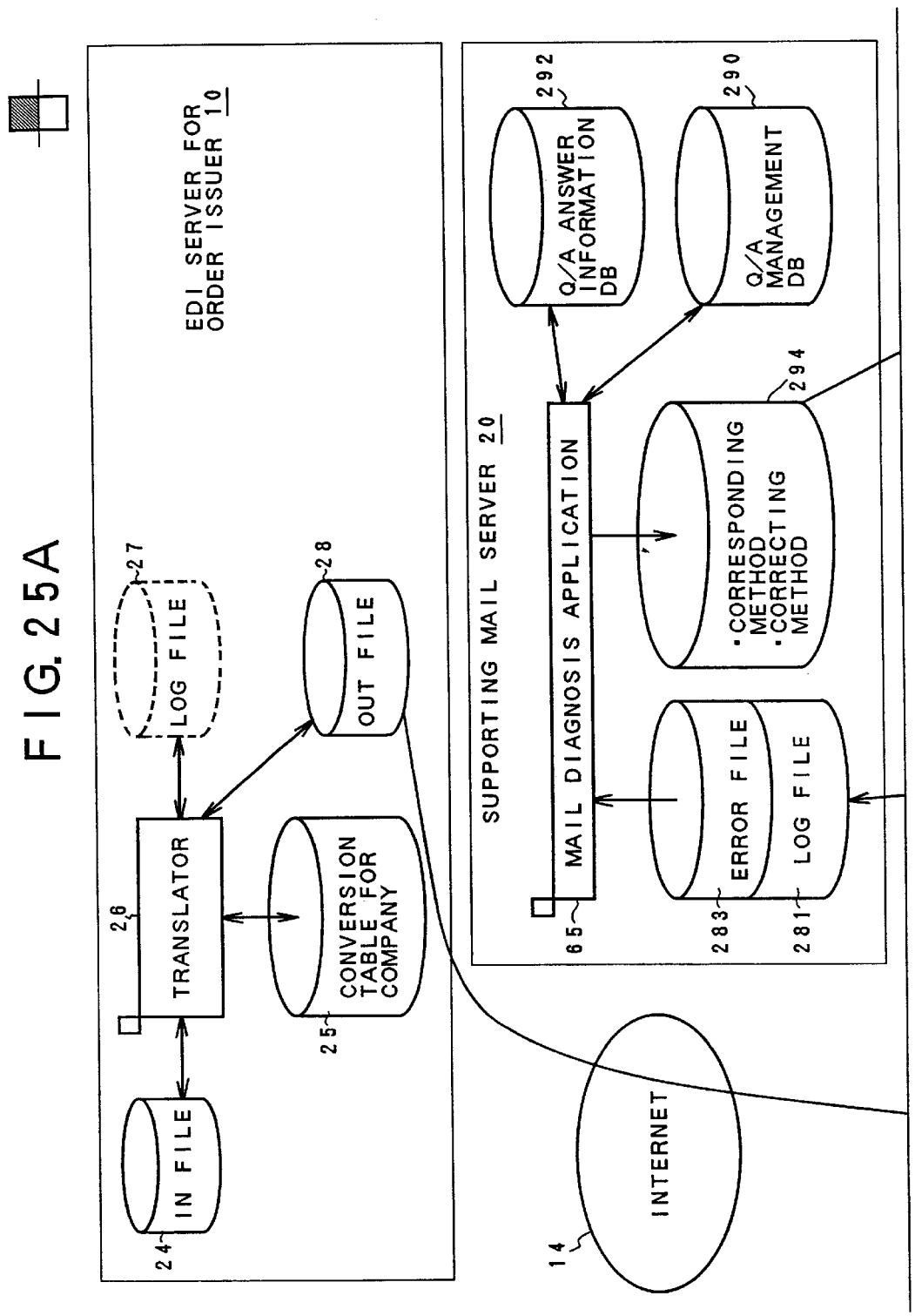

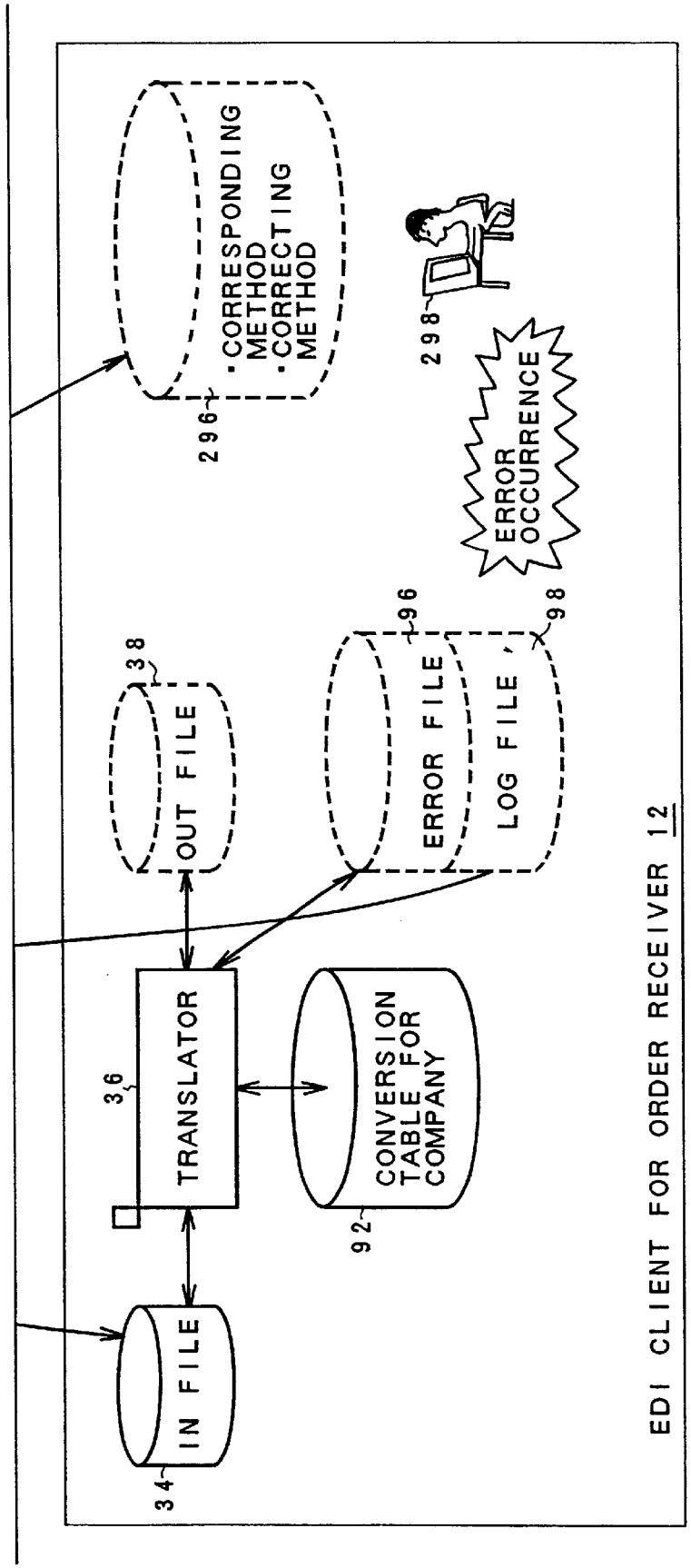

| PROCESSING No. 404 | PROCESSING DATE 406-1 | PROCESSING TIME 406-2 | ERROR CODE 408 | ERROR CONTENTS 410 |
|---|---|---|---|---|
| 0010 | 19971120 | 144342 | 2102 | HEADER WHICH IS NOT DESIGNATED IN MAPPING OF USE INFORMATION WAS FOUND. |

| ATTENTION ☐<br>ABNORMAL ■ | ERROR CODE | ERROR CONTENTS OF TRANSMITTING PROCESS |
|---|---|---|
| ■ | 1001 | THERE IS NO END (NEW PARAGRAPH) OF RECORD OF UNLIMITED LOCAL FILE %s. |
| ■ | 1002 | RECORD LENGTH OF FIXED LENGTH LOCAL FILE %s IS NOT CORRECT. |
| ■ | 1003 | FILE %s OPEN ERROR OCCURRED IN BINARY TRANSMISSION. |
| ■ | 1004 | FILE %s READ ERROR OCCURRED IN BINARY TRANSMISSION. |
| ■ | 1005 | STANDARD MESSAGE WRITE ERROR OCCURRED IN BINARY TRANSMISSION. |
| ■ | 1006 | STANDARD MESSAGE WRITE ERROR OCCURRED. |
| ■ | 1101 | USING MODE IS NOT TRANSMISSION. |
| ☐ | 1102 | THERE IS RECORD INFORMATION OTHER THAN TARGET IN %s. |
| ☐ | 1103 | USER UNIQUE INFORMATION SET BY USE INFORMATION IS NOT FOUND %s. |
| ■ | 1104 | FAILED IN OBTAINING TARGET FIELD %s OF LOCAL FILE. |
| ☐ | 1201 | SINCE DATA IS MISMATCHED, IT CANNOT BE PROCESSED. |

| ATTENTION ☐<br>ABNORMAL ■ | ERROR<br>CODE | ERROR CONTENTS OF RECEIVING PROCESS |
|---|---|---|
| ■ | 2001 | CONFIGURATION OF STANDARD FILE IS NOT CORRECT. |
| ■ | 2002 | LOCAL FILE %s CANNOT BE FORMED. |
| ■ | 2003 | ERROR OCCURRED IN FORMATION OF INITIAL VALUE RECORD OF LOCAL FILE. |
| ■ | 2004 | BINARY FILE IS NOT DESIGNATED. |
| ■ | 2005 | AUTOMATIC NUMBER COLLECTION CANNOT BE PERFORMED IN BINARY RECEPTION %s. |
| ■ | 2006 | FILE READ ERROR OCCURRED IN BINARY RECEPTION. |
| ■ | 2007 | FILE WRITE ERROR OCCURRED IN BINARY RECEPTION. |
| ■ | 2008 | SIZE OF BINARY FILE IS NOT DESIGNATED IN STANDARD FILE. |
| ■ | 2101 | USING MODE IS NOT RECEPTION. |
| ☐ | 2102 | HEADER WHICH IS NOT DESIGNATED IN MAPPING OF USE INFORMATION WAS FOUND. |
| ■ | 2103 | THIS STANDARD FILE IS NOT MATCHED WITH COMPANY AND CUSTOMER CODES %s. |
| ■ | 2104 | REFERENCE VERSION %s OF THIS STANDARD FILE DIFFERS. |
| ■ | 2105 | THIS STANDARD FILE HAS NO SYNTAX ID SYMBOL. |
| ■ | 2106 | MESSAGE TYPE %s OF THIS STANDARD FILE DIFFERS. |
| ■ | 2107 | SIZE EXCEEDS THE MAX. SIZE (20480 BYTES) OF ONE SEGMENT DURING EDITION. |
| ■ | 2108 | SEGMENT %s CANNOT BE CORRECTLY PERFORMED. |
| ■ | 2109 | THERE IS NON-EXISTENT SEGMENT CODE %s IN STANDARD FILE. |

FIG. 30

| ID | RECEPTION DATE/TIME | COMPANY CODE | CUSTOMER CODE | REFERENCE VERSION | REFERENCE RELEASE |
|---|---|---|---|---|---|
| 1 | 19971120 2020 | STOZW01 | ITOYE01 | D | 93A |

| MESSAGE CODE | THE NUMBER OF INPUT ITEMS | THE NUMBER OF OUTPUT ITEMS | RESULT CODE | PROCESSING No. |
|---|---|---|---|---|
| ORDERS | 10 | 0 | 99 | 0010 |

| EXECUTION DATE/TIME | ERROR CODE | ERROR CONTENTS |
|---|---|---|
| 19971120140352 | 2102 | MAPPING OF USE INFORMATION |

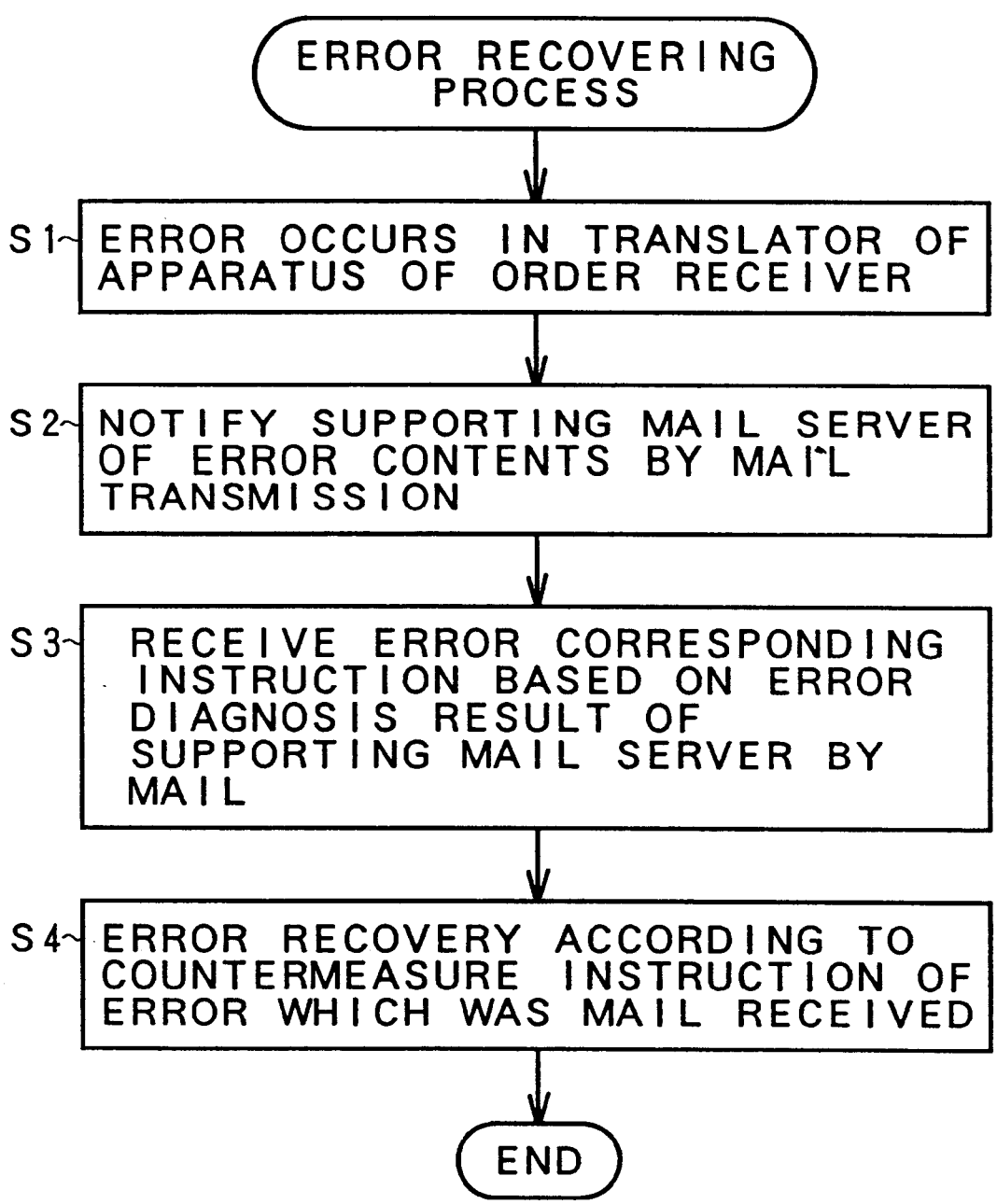

_US 6,658,483 B1_

ELECTRONIC TRANSACTION SYSTEM AND METHOD AND STORAGE MEDIUM STORING THEREIN CONTROL PROGRAM FOR EXECUTING FORMAT CONVERSION IN ELECTRONIC TRANSACTION

BACKGROUND OF THE INVENTION

The present invention relates to an electronic transaction system having a translator for executing a conversion between a local message having a local format peculiar to the user and a standard message having a standard format such as EDIFACT or the like which is transmitted and received via a network. More particularly, the invention relates to an electronic transaction system, a set-up apparatus, and a set-up supporting apparatus which are used for efficiently executing a set-up work of a conversion table for a translator and also relates to a computer readable storage medium in which control programs necessary for those system and apparatuses have been recorded.

Hitherto, an EDI (Electronic Data Interchange) system for executing transactions among companies such as issue and reception of orders of products, management of articles, and the like by using an electronic message has been being rapidly spread on an international scale over national boundaries. The conventional EDI system has a relatively strong regional characteristic. For example, in Japan, development of an EDI system peculiar to each type of industry is promoted. For instance, in the electric industry, an EIAJ standard promoted by Electronic Industries Association of Japan (EIAJ) is provided. Actual transactions among companies are, however, spread over the industries. Consequently, as a domestic standard EDI, the CII syntax rule is provided in Japan and ANSI X. 12 is provided in U.S.A. Further, as an international standard EDI, there is EDIFACT which is spread mainly in Europe. It is desired that the standards are shifted to EDIFACT as an international standard in both of U.S.A. and Japan in near future, thereby building a global EDI system on a global scale.

An EDI system which is presently put into practical use, however, uses an electronic message according to a local format peculiar to the user as an industrial standard. In order to effectively use resources according to the local format and to shift to EDIFACT of the international standard, a function of a translator for performing conversion between an electronic message according to a local format of each enterprise and an electronic message according to a standard format is very important. For the translator, a mapping table for conversion in which the corresponding relation between items of the local format and items of the standard format has been defined is necessary. Generally, with respect to a work for forming the mapping table, the operator performs a work for linking the items of the standard format to the relevant items of the local format.

Under a situation such that the EDI system is developed on a full scale, for example, electronic transactions are performed between one company serving as an order source and a plurality of companies, generally, tens to hundreds of companies serving as order destinations. In such a case, when customers use different local formats, there is troublesomeness that a different mapping table has to be formed for each customer. It is, therefore, considered to construct an EDI system in which a local format is determined by one company as an order source and a common local format is used with respect to all of the customers. By commonly using the local format, it is sufficient to basically form only one kind of the mapping table which is used by the translator, so that an amount of troublesomeness and labor which are required for the work of forming the mapping table can be largely reduced.

Further, in case of constructing the EDI system in which the local format is commonly used, it is necessary to proceed the system construction by the following procedure.

procedure I: Establishment and preparation of an in-house system at the order source (establishment of a local format and preparation of the in-house system at the order source)

procedure II: Schedule planning of an EDI system construction with all of the customers procedure III: execution of an EDI connection test with each customer along the constructed schedule Among them, with respect to the procedures I and II, there is relatively little problem since they can be performed as in-house works of the order source. With respect to the procedure III, however, a work occurs for each of tens to hundreds of customers, so that an extremely long period of time and a number of processes for correspondence are necessary to complete the EDI connection tests with all of the customers.

SUMMARY OF THE INVENTION

According to the invention, there are provided an electronic transaction system, a set-up processing module, and a set-up supporting apparatus which make a set-up work of a translator to be used at a customer efficient, thereby enabling a connection test to be completed in a short period, and there is also provided a computer readable recording medium in which various control programs have been recorded. An EDI system of the invention comprises an order issuer apparatus (server for an order issuer), an order receiver apparatus (client for an order receiver), a set-up supporting apparatus, and a set-up processing apparatus. The order issuer apparatus has a translator for order issue for converting a local transaction message of a local format to a standard transaction message of a standard format which is transmitted through a network. The order receiver apparatus has a translator for order receipt for converting the standard transaction message of the standard format received though the network to the local transaction message of the local format. The set-up supporting apparatus stores a model table which is used for conversion of the translator in the order receiver apparatus and a set-up supporting tool for modifying the model table and setting up into the translator. The set-up processing apparatus is provided for the order receiver apparatus, receives a down-load of the model table and the set-up supporting tool by a supporting request to the set-up supporting apparatus, and automatically executes a set-up process of the translator on the basis of an input of predetermined individual information. According to the electronic transaction system of the invention as mentioned above, by providing the set-up processing apparatus and the set-up supporting apparatus for the order receiver apparatus, by merely sending a supporting request from the set-up processing apparatus and inputting individual information regarding the order receiver, the model table and the supporting tool are down-loaded, and the set-up process for the translator is automatically performed, so that the number of works of an EDI connection test can be largely reduced. Even a customer having none of the knowledge and experience of the EDI syntax can immediately introduce the EDI system and use it.

The set-up supporting apparatus stores as model tables: a local message table in which local messages have been defined; a standard message table in which standard formats have been defined; a mapping table in which the link relation between the local message table and the standard message table has been defined; and a use set table in which the kinds of mapping table and local message table have been set. As set-up supporting tools, a set-up operation picture plane, a set-up executing module, and a platform as a virtual machine environment for making the set-up executing module operative are stored. By sending the supporting request to the set-up supporting apparatus, the set-up operation picture plane and the platform are down-loaded to the set-up processing apparatus. By an authorizing requesting operation after the individual information was inputted by using the set-up operation picture plane, the local message table, standard message table, mapping table, use set table, and set-up executing module are down-loaded, the mapping table and the use set table are modified on the basis of the individual information and are converted to tables peculiar to the company, and the resultant tables are set up into the translator. As a minimum construction necessary for setting up in the translator, the set-up supporting apparatus stores the mapping table in which the link relation between the local message table and the standard message table excluding the local message table and the standard message table has been defined as a model table. As set-up supporting tools, the set-up operation picture plane, set-up executing module, and platform as a virtual machine environment for making the set-up executing module operative are stored. In this case, the set-up processing module sends the supporting request to the set-up supporting apparatus and the set-up operation picture plane and the platform are down-loaded. By executing the authorizing requesting operation after the individual information was inputted by using the set-up operation picture plane, the mapping table, use set table, and set-up executing module are down-loaded, the mapping table and use set table are modified on the basis of the individual information and are converted to company tables, and the company tables are set up into the translator. The set-up processing apparatus inputs a company code, a customer code, and a using platform as individual information and notifies the set-up supporting apparatus of the authorizing request including the company code, customer code, using platform, and further an ID code on the basis of the authorizing requesting operation. The set-up supporting apparatus has a customer management table in which an ID code of a partner of the electronic transaction has been preliminarily registered. When collation coincidence of the ID code and adaptation of the using platform are obtained on the basis of the authorizing request from the set-up processing apparatus, the company code, customer code, and using platform are registered in the customer management table. Further, on the basis of a success of the authorizing process, the model tables and set-up supporting tools are down-loaded to the set-up processing apparatus. The set-up executing module down-loaded to the set-up processing apparatus changes the company code and the customer code in the mapping table and the use set table to the company code and customer code inputted from the operation picture plane, thereby converting them to a mapping table and a use set table for the company. Further, as an IN file for testing, the set-up supporting apparatus stores transaction messages for testing (a local transaction message for testing and a standard transaction message for testing) and down-loads the transaction message for testing in response to the supporting request from the set-up processing apparatus. The set-up processing apparatus executes a conversion test of the set-up completed translator by the down-loaded transaction message for testing and notifies the set-up supporting apparatus of the test result. For example, the platform is a JAVA applet and the set-up executing module is a JAVA program module which operates on the JAVA applet.

Further, according to the invention, there are provided: an error mail transmitting apparatus for transmitting error contents as an electronic mail when errors occur in the translator of the order issuer apparatus; a supporting mail apparatus for acquiring countermeasure information for the occurred errors by retrieving a database based on the error contents when the electronic mail is received from the error mail transmitting apparatus and returning an electronic mail; and an error correspondence processing apparatus for receiving the electronic mail from the supporting mail apparatus and presenting the countermeasure information for the occurred errors in the translator. Consequently, the user of the electronic transaction system can be provided with the proper error correspondence information for the errors occurred in the translator so that it is possible to promptly and properly cope with the errors in the translator even if the user has none of the experience and knowledge of the EDI syntax, and the system can be smoothly operated.

According to the invention, there is provided an electronic transaction apparatus which functions as, for example, an order receiver apparatus and has a translator for executing a conversion between the local transaction message and the standard transaction message which is transmitted and received through the network. According to the invention, the electronic transaction apparatus has a set-up processing module for receiving down-load of a model table and a set-up supporting tool in response to a supporting request for a set-up supporting apparatus and automatically executing a set-up process of the translator on the basis of an input of predetermined individual information. The details of the electronic transaction apparatus functioning as an order receiver apparatus in this case are the same as those of the electronic transaction system.

According to the invention, there is also provided a set-up supporting apparatus for supporting a set-up of the translator which is provided for the electronic transaction system and executes the conversion between the local transaction message and the standard transaction message which is transmitted and received via the network. The set-up supporting apparatus has the model table which is used for the translator of the electronic transaction apparatus and the set-up supporting tool for modifying the model table and setting up into the translator and down-loads the model table and set-up supporting tool in response to the supporting request from the electronic transaction apparatus, thereby allowing the set-up process of the translator to be automatically executed. The details of the set-up supporting apparatus in this case are also the same as those of the electronic transaction system.

According to the invention, there is provided a computer readable recording medium in which a control program of an electronic transaction system has been recorded, comprising:

an order issue processing module having a translator for order issue for converting a local transaction message of a local format into a standard transaction message of a standard format which is transmitted via a network:

one or a plurality of order receipt processing modules each having a translator for order receipt for converting the standard transaction message of the standard format received via the network into the local transaction message of the local format;

a set-up supporting module in which a model table which is used for the conversion of the translator of the order receipt processing module and a set-up supporting tool for modifying the model table and setting up into the translator have been stored; and a set-up processing module which is provided for the order receipt processing module, receives a down-load of the model table and the set-up supporting tool in response to a supporting request for the set-up supporting module, and automatically executes a set-up process of the translator on the basis of an input of predetermined individual information.

According to the invention, there is also provided a computer readable recording medium which functions as a set-up processing apparatus and in which a control program has been recorded, comprising:

a translator for executing a conversion between a local transaction message of a local format and a standard transaction message of a standard format which is transmitted and received via a network; and a set-up processing module for receiving a down-load of the model table and the set-up supporting tool by a supporting request for the outside and automatically executing a set-up of the translator on the basis of an input of predetermined individual information.

Further, according to the invention, there is also provided a computer readable recording medium which functions as a set-up supporting apparatus and in which a control program has been recorded, comprising:

a model table which is used for a translator that is provided for an electronic transaction module and executes a conversion between a local transaction message of a local format and a standard transaction message of a standard format which is transmitted and received via a network;

a set-up supporting tool for modifying the model table and setting up into the translator; and a set-up supporting module for down-loading the model table and the set-up supporting tool in response to a supporting request from the outside and allowing a set-up process of the translator to be automatically executed.

The above and other objects, features, and advantages of the present invention will become more apparent from the following detailed description with reference to the drawings.

BRIEF DESCRIPTION OF THE DRAWINGS

FIGS. 1A and 1B are system constructional diagrams according to the invention;

FIG. 3 is an explanatory diagram of a customer management table in FIGS. 2A and 2B;

FIG. 4 is an explanatory diagram of a first use set table which is used in FIGS. 2A and 2B;

FIG. 5 is an explanatory diagram of a second use set table which is used in FIGS. 2A and 2B;

FIGS. 7A to 7E are explanatory diagrams of a mapping table in FIGS. 2A and 2B;

FIGS. 8A and 8B are explanatory diagrams of a local layout table in FIGS. 2A and 2B;

FIGS. 9A and 9B are explanatory diagrams of the local layout table in FIGS. 2A and 2B which follows a lower part of FIGS. 8A and 8B;

FIGS. 10A and 10B are explanatory diagrams of a standard IN file for testing which is used in a translator which has already been set up in FIGS. 2A and 2B;

FIG. 11 is an explanatory diagram of a local IN file for testing which is used in a translator which has already been set up in FIGS. 1A and 1B;

FIG. 13 is an explanatory diagram of an LOG file read picture plane of FIG. 12;

FIG. 15 is an explanatory diagram of an operation picture plane by a mapping server in FIGS. 1A and 1B;

FIGS. 16A and 16B are explanatory diagrams of a specific example of the operation picture plane of FIG. 15;

FIG. 18 is an explanatory diagram of a message classification of EDIFACT;

FIG. 19 is an explanatory diagram of the message classification of EDIFACT which follows FIG. 18;

FIG. 20 is an explanatory diagram of the message classification of EDIFACT which follows FIG. 19;

FIG. 21 is an explanatory diagram of a message table regarding a message "DESADV" of EDIFACT as an example;

FIGS. 22A and 22B are explanatory diagrams of a segment table of EDIFACT;

FIG. 23 is an explanatory diagram of a single data element table which is used in EDIFACT;

FIG. 24 is an explanatory diagram of a compound data element table which is used in EDIFACT;

FIGS. 25A and 25B are function explanatory diagrams of a recovering process for an error occurrence in the translator in FIGS. 1A and 1B;

FIG. 26 is an explanatory diagram of an error file in FIGS. 25A and 25B;

FIG. 28 is an explanatory diagram of a list of transmission error contents which is used in the error file in FIGS. 25A and 25B;

FIG. 29 is an explanatory diagram of a list of reception error contents which is used in the error file in FIGS. 25A and 25B;

FIG. 30 is an explanatory diagram of a Q/A management database in FIGS. 25A and 25B;

FIG. 32 is a flowchart for an error recovering process in FIGS. 25A and 25B.

DETAILED DESCRIPTION OF THE PREFERRED EMBODIMENT

System construction

Figure 2A:
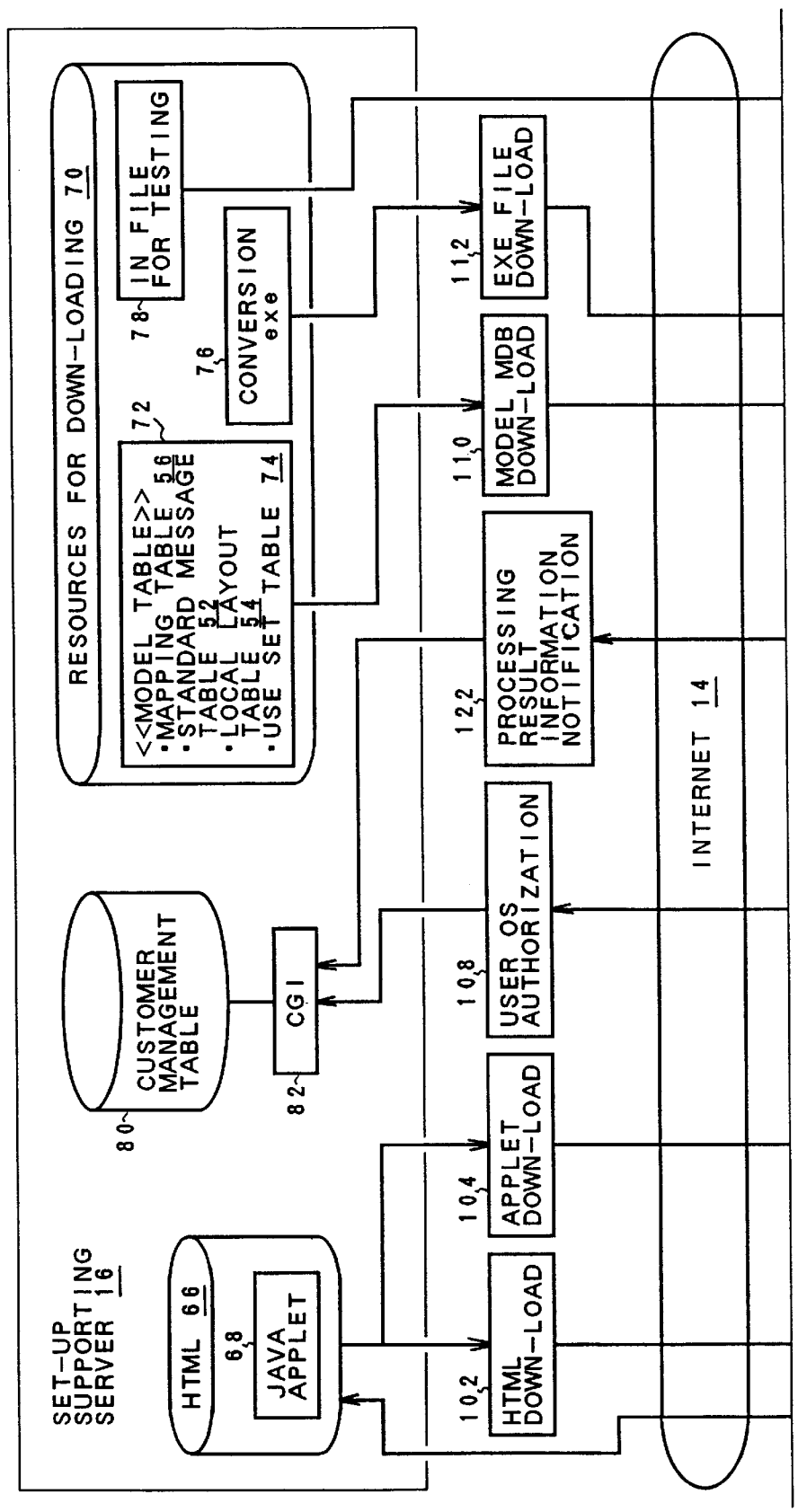
FIGS. 2A and 2B are explanatory diagrams of a set-up operation for translators in FIGS. 1A and 1B.

FIGS. 1A and 1B are block diagrams of a system construction of an electronic transaction system, namely, an EDI system of the invention. In the EDI system, an EDI sever 10 for order issuer and an EDI client 12 for order receiver are connected via an internet 14. Although a number of EDI clients 12 for order receivers are provided for the EDI server 10 for order issuer, for simplicity of explanation, one EDI client 12 for order receiver is shown in FIGS. 1A and 1B. The EDI server 10 for order issuer has an application module 22, a local format file 24, a translator 26, an international standard format file 28, and a communicating module 30. In correspondence to the above, the client 12 for order receiver comprises a communicating module 32, an international standard format file 34, a translator 36, a local format file 38, and an application module 40. A message is transmitted and received between the EDI server 10 for order issuer and the EDI client 12 for order receiver via the internet 14 in accordance with, for example, an international standard format of EDIFACT known as an international standard EDI system. On the other hand, on each side of the application modules 22 and 40, a message according to a local format peculiar to the user is used. In the EDI system for order issue and order receipt of FIGS. 1A and 1B, the local format is determined on the side of the EDI server 10 for order issuer and the same local format is provided for the EDI client 12 for order receiver. In the EDI system of the invention, therefore, the same local format is commonly used in the EDI server 10 for order issuer and that of the EDI client 12 for order receiver. As a common local format on the order issuer side, for example, EIAJ of the standard of Japanese Electronic Industry Association or the like is used. The EDI server 10 for order issuer has the local format file 24 for storing an EDI message according to the local format of the application module 22. When an order is issued, the local format file 24 is inputted as an IN file to the translator 26 and is converted to an international standard format of EDIFACT and is stored into the international standard format file 28. In this case, the international standard format file 28 is used as an OUT file. The EDI message for order issue stored in the international standard format file 28 is sent to the EDI client 12 for order receiver via the internet 14 by the communicating module 30. The communicating module 30 executes a communication of the message exchange between the server and the client via the internet 14. A communication protocol is not especially determined in the international standard of EDIFACT. For example, proper communication software such as CORDEX or the like can be used. The communicating module 32 in the EDI client 12 for order receiver uses communication software such as CORDEX or the like in a manner similar to the communicating module 30 on the server side. The EDI message of EDIFACT from the EDI server 10 for order issuer sent via the internet 14 is received and stored in the international standard format file 34. Consequently, the international standard format file 34 is used as an IN file. The translator 36 receives the reception message stored in the international standard format file 34, converts it to a message of the local format, stores the converted message into the local format file 38, and provides it as an order receipt message to the application module 40 using the local format. It will be obviously understood that in any one of the translator 26 on the server side and the translator 36 on the client side, not only the conversion in the message transmitting direction at the time of the order issue but also a format conversion in the message exchange in the opposite direction can be performed. In the EDI system constructed by the EDI server 10 for order issuer having the translator 26 and the EDI client 12 for order receiver having the translator 36, according to the invention, in order to efficiently perform the set-up of the translator 36 provided for the EDI client 12 for order receiver in a short time, a set-up supporting server 16 is provided via the internet 14 and, further, a set-up processing module 15 is provided for the EDI client 12 for order receiver. In the set-up operation of the translator 36 provided for the EDI client 12 for order receiver, a process for modifying a mapping table to convert a message of the local format to a message of the international standard format of EDIFACT to a mapping table that is peculiar to the order receiver and setting up the mapping table peculiar to the order receiver is mainly executed. Consequently, in a set-up supporting module 48 in the set-up supporting server 16, down-load resources such as mapping table, standard message table, local layout table, program as a set-up supporting tool, and the like are prepared. The down-load resources are down-loaded to the EDI client 12 for order receiver side in response to a supporting request from the set-up processing module 15 in the EDI client 12 for order receiver. After that, by merely inputting individual information necessary to change to the mapping table peculiar to the order receiver side, the client automatically converts to the peculiar mapping table and the mapping table is set up into the translator 36. The mapping table which is down-loaded as a resource from the set-up supporting server 16 is formed by a mapping server 18. In the mapping server 18, a standard message table 52 of EDIFACT and a local layout table 54 according to the local format are prepared and a linking operation for making items of the EDIFACT standard message correspond to items of the local message is executed by a mapping processing module 50, thereby forming a mapping table 56 necessary for the translator. The mapping table 56 formed by the mapping server 18 is stored as one of the down-load resources into the set-up supporting module 48 in the set-up supporting server 16 together with the standard message table 52 and local layout table 54.

In addition to the set-up of the translator 36 in the EDI client 12 for order receiver, in the EDI system of FIGS. 1A and 1B, when a conversion error occurs in the translator 36 in the EDI client 12 for order receiver, in order to make it possible to properly cope with the occurrence of the error, an error mail transmitting module 42 and an error correspondence processing module 44 are provided for the EDI client 12 for order receiver and a support mail server 20 is provided via the internet 14. The support mail server 20 is constructed by a communicating module 58, a mail transmitting and receiving module 60, an error diagnosis processing module 62, and an error correspondence instructing module 64. When a conversion error occurs in the translator 36 in the EDI client 12 for order receiver, the error contents are sent as an electronic mail from the error mail transmitting module 42 to the support mail server 20 via the internet 14. The support mail server 20 receives the electronic mail by the mail transmitting and receiving module 60 via the communicating module 58, supplies the error contents of the received mail to the error diagnosis processing module 62, uses the error contents as a question key, and refers to a database in which correspondence contents corresponding to the question key have been stored. On the basis of the result of reference to the database, error correspondence information is sent from the error correspondence instructing module 64 to the EDI client 12 for order receiver via the internet 14 and correspondence instruction information is presented by the error correspondence processing module 44, thereby enabling a recovery for the conversion error occurred in the translator 36. The error recovery for the conversion error in the translator 36 will be further clearly explained hereinlater.

Set-up

Figure 2B:
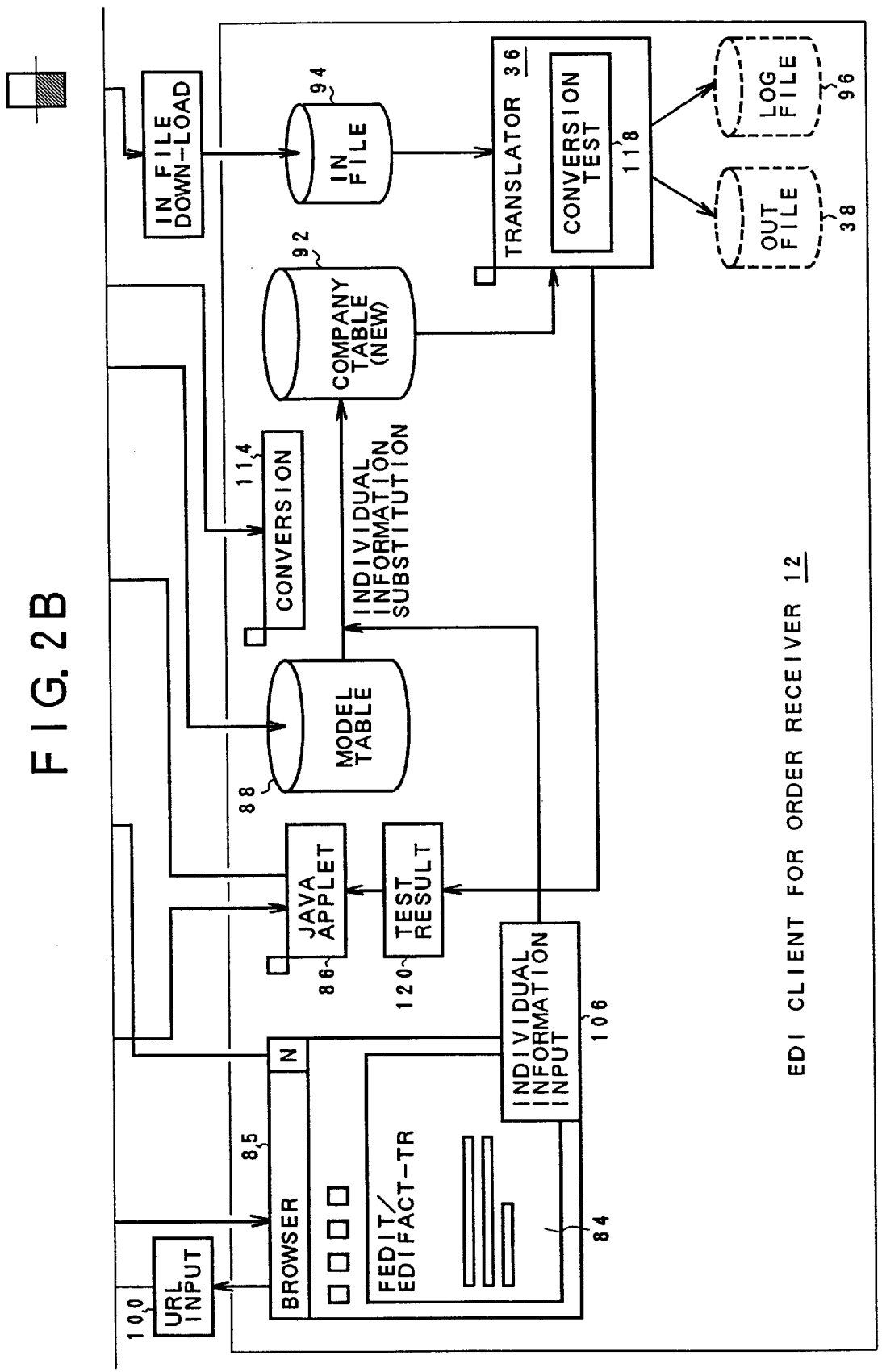

FIGS. 2A and 2B are explanatory diagrams of a function for the set-up of the translator 36 on the client side by the set-up supporting server 16 provided in the EDI system in FIGS. 1A and 1B and the set-up processing module 15 provided in the EDI client 12 for order receiver. First, an HTML file 66 is provided on the set-up supporting server 16 side. Operation picture plane information for providing a JAVA applet 68 to construct a platform serving as an operation environment of a virtual machine for running the program which was down-loaded on the side of the EDI client 12 for order receiver and a set-up operation picture plane 84 which is used for the set-up operation to a WWW browser 85 has been stored in the HTML file 66. Resources 70 for down-loading are provided for the set-up supporting server 16. A model table 72, a conversion execution programming module 76 serving as a substance to execute the table conversion for the set-up, and an IN file 78 for testing have been stored in the resources 70 for down-loading. The mapping table 56, standard message table 52, local layout table 54, and a use set table 74 are included in the model table 72. The use set table 74 manages the kinds of mapping table 56 and local layout table 54. Further, a customer management table 80 is provided for the set-up supporting server 16. A notification from the side of the EDI client 12 for order receiver is received by a common gate interface (CGI) 82 and the table contents are registered and updated. The ID code on the side of the EDI client 12 for order receiver which is connected to the EDI server 10 for order issuer through the internet 14 has been initially set in the customer management table 80. When the set-up of the translator 36 on the client side is completed, the individual information on the client 12 side and a result of the set-up are registered. Therefore, by referring to the customer management table 80, the state on the side of the EDI client 12 for order receiver in which the connection test has been completed at present through the internet 14 can be known.

FIG. 3 shows a specific example of the customer management table 80 provided for the set-up supporting server 16 in FIG. 2A. The customer management table 80 has an ID code 124, a company code 126, a customer code 128, a using platform 130, an execution result 132, and a notification date/time 134. In the initial state in which the set-up of the translator 36 on the client side is not finished, only the ID code 124 is registered.

When the set-up for the translator 36 on the client 12 side is completed, the company code 126, customer code 128, and using platform 130 are registered. Further, when a conversion test which is executed after completion of the set-up is performed, the execution result 132 is stored and the notification date/time 134 is registered. The company code 126 is a code allocated to the enterprise in which the EDI client 12 for order receiver has been installed. The customer code 128 is a code allocated to the order issuer enterprise having the EDI server 10 for order issuer in FIGS. 1A and 1B. Since there is one order issue destination, all of the customer codes are the common code. The using platform 130 is the OS environment, namely, the operation environment on the client side in which the JAVA applet 68 of the HTML file 66 is down-loaded. For example, a platform having adaptivity such as "WINDOWS NT", "WINDOWS 95", or the like is registered. The execution result 132 is set to "0" when the conversion test is normally performed and is set to "99" when an error occurs.

FIGS. 4 and 5 show the details of the use set table 74 provided in the model table 72 of the down-loading resources 70. The use set table 74 is constructed by a first use set table 74-1 in FIG. 4 and a second use set table 74-2 in FIG. 5. The first use set table 74-1 in FIG. 4 expresses the kind of mapping table 56 which is set up into the translator 36. For example, as shown in a processing number 136, two kinds of mapping tables of "0010" and "0020" are set and either the "transmission" or "reception" is registered by a number name 138. When a transmission and reception flag 140 is set to "1", the mapping table for reception is selected. When the flag 140 is set to "0", the mapping table for transmission is selected. Subsequently, a directory code 142 on the storage destination side is provided. Further, a company code 144 and a customer code 146 which the mapping table has are provided. In addition, a standard file name 148 and a standard file output 150 of EDIFACT which are used in the mapping table are provided.

The second use set table 74-2 in FIG. 5 shows a set state of the local layout table 54. The second use set table 74-2 has a processing number 152, a sequence number 154, a mapping code 156, a grouping flag 158, a local file name 160, an output mode 162, and a local record length 164. As message kinds of the EDIFACT standard file corresponding to the local layout table, for example, "ORDERS" and "DESADV" have been stored in the mapping code 156 and show "01" indicative of one message, respectively. The message kinds of EDIFACT will be clearly explained hereinlater in FIGS. 17 to 20.

Figure 6:
FIG. 6 is an explanatory diagram of a set-up operation picture plane in FIGS. 2A and 2B.
Figure 7C:
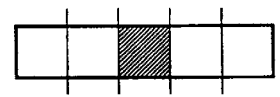
Figure 7D:
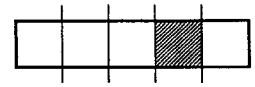
Figure 7E:
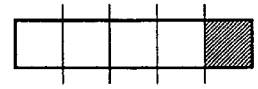

FIG. 6 shows a set-up operation picture plane stored in the HTML file 66 of the set-up supporting server 16. By receiving the designation of a homepage on the order issuer side by the browser 85 of the EDI client 12 for order receiver, this picture plane is down-loaded as a set-up operation picture plane 84. In the set-up operation picture plane 84, "Perform the following information registration, press "authorize" button, and only operate in accordance with screen contents, then the set-up of FEDIT/EDIFACT-TR is completed."

is displayed as an operation message 165. A company enterprise code input frame 166, a customer enterprise code input frame 168, and a using platform set window 170 are provided on the lower side of the operation message 165. An order receiver enterprise code allocated to the client side is inputted into the company enterprise code input frame 166. An order issuer enterprise code is inputted to the customer enterprise code input frame 168. As for the using platform set window 170, a using platform which the OS on the client side has is selected by selecting an inversion bar. An authorizing request key 172 is provided on the lower side of those input frames and "Start auto set-up" is displayed. Further, a clear key 174 is provided.

FIGS. 7A to 7E (hereinafter, also simply represented by FIG. 7) show a specific example of the mapping table 56 provided in the model table 72 of the down-loading resources 70 in FIGS. 2A and 2B. When the mapping table 56 of FIG. 7 is seen from the head position on the left side, a mapping code 176, an MP sequence number 178, a mapping name 180, a directory code 182, a record layout code 184, a message code 186, a segment/element attribute 188, a segment/element code 190, and a level number 192 are provided. Subsequently, the maximum repeat count 194, the minimum number of digits 196, the maximum number of digits 198, an attribute 200, an editing method 202, the maximum repeat count GRP 204, a sequence number 206, a layout offset 208, a layout length 210, a company 212, and a customer 214 are provided from the left side. Further, a QSE area 216, a compile flag 218, and an inevitable flag 220 are provided from the left side. The mapping table 56 in FIGS. 7A to 7E is a standard message table of EDIFACT if the sequence No. 206 and the QSE area in FIG. 7 are excluded. By linking with the local layout table 54 in FIGS. 8A, 8B, 9A, and 9B, the sequence No. 206 and the QSE area 216 in FIG. 7 are added, thereby constructing the mapping table 56.

The mapping table of FIGS. 7A to 7E relates to the message kind "PRICAT" of EDIFACT as an example. As shown in the lowest column in FIG. 18, the message kind "PRICAT" is a message regarding the price or catalog. The data structure itself of the mapping table 56 of FIGS. 7A to 7E has a message structure of EDIFACT of FIG. 17, which will be explained hereinlater and has a form in which the link information with the local layout table serving as a sequence No. 206 and a QSE area 216 in FIG. 7 is added to such a message structure.

Figure 8B:
Figure 9B:

FIGS. 8A, 8B, 9A, and 9B show a specific example of the local layout table 54 which is used to form the mapping table 56 in FIGS. 7A to 7E and similarly relate to a message kind "PRICAT" of EDIFACT as an example. The local layout table 54 has a record layout code 222, a sequence "SEQ" 224, a record layout name 226, a mode 228, an SEQ name 230, a record level number 232, a repeat count 234, an attribute 236, a start position 238, the number of digits 240, a company flag 242, and a customer flag 244 from the left side in FIGS. 8A and 8B. The local layout table 54 of FIGS. 9A and 9B which follows the lower side of FIGS. 8A and 8B also has similar items. In the local layout table 54, by linking with the corresponding standard message table of EDIFACT, "00006" and "00007" of the sixth and seventh rows of the item "SEQ" showing the sequence number 224 are registered as link information into the column of the sequence number 206 of the mapping table 56 in FIG. 7. On the other hand, the "order issuer enterprise code" and "order receiver enterprise code" of the SEQ name 230 corresponding to "00006" and "00007" of the sixth and seventh rows of the item "SEQ" showing the sequence number 224 of the local layout table 54 in FIGS. 8A and 8B are stored as link information to the sixth and tenth rows of the QSE area 216 in the mapping table 56 in FIG. 7. The mapping table 56 in FIGS. 7A to 7E corresponds to only three portions of service segments "UNB" and "UNH" and data segment "BGM" at the head in the standard message of EDIFACT and is constructed by tens to hundreds of segments as a whole. With respect to the local layout table 54 in FIGS. 8A, 8B, 9A, and 9B as well, a part of the head is shown.

As an IN file for testing 78 stored in the down-loading resources 70 in FIGS. 2A and 2B, there are a standard IN file for testing 78-1 in FIGS. 10A and 10B and a local IN file for testing 78-2 in FIG. 11. The standard IN file for testing 78-1 in FIGS. 10A and 10B is used for a test of the conversion from the EDIFACT standard message of the translator 36 in which the set-up has been completed in the EDI client 12 for order receiver to the local message. The standard IN file for testing 78-1 constructs one standard message for testing by the service segments UNH to UNT subsequent to the head service segment UNB. The local IN file for testing 78-2 in FIG. 11 is used for a test of the conversion in the opposite direction of the translator 36 in which the set-up has been finished, namely, the conversion from the local message to the standard message of EDIFACT. In the local IN file for testing 78-2 in FIG. 11, the SEQ name 230 of the local layout table 54 in FIGS. 8A and 8B is formed in accordance with the number (240) of digits. For example, a numerical value "4906600000000" of 13 digits at the head is a transmission partner code, a next numerical value "19971011" of 8 digits is a transmission date, a next numerical value "000000" of 6 digits is a data processing number, a next "PRICAT" of 6 digits is a message name, and a next numerical value "1" of one digit is an action request code. After that, the subsequent numerical values and characters conform with the local layout table 54 in FIGS. 8A and 8B.

The set-up operation of the translator 36 of the EDI client 12 for order receiver will now be described with reference to FIGS. 2A and 2B. First, the operator of the EDI client 12 for order receiver designates a homepage of the HTML file 66 by a URL input 100 of the set-up supporting server 16 on the order issuer side via the internet 14 by the WWW browser 85. In response to the designation of the homepage, a down-load 102 of the HTML file 66 is performed from the set-up supporting server 16 and the set-up operation picture plane 84 is displayed in the WWW browser 85. The details of the set-up operation picture plane 84 are as shown in FIG. 6. At the same time, an applet down-load 104 of the JAVA applet 68 is executed from the set-up supporting server 16. A JAVA applet 86 serving as an operation environment of a virtual machine which executes the JAVA program is formed on the EDI client 12 for order receiver. Subsequently, the operator of the EDI client 12 for order receiver executes an individual information input 106 by using the set-up operation picture plane 84 of the WWW browser 85. The individual information input 106 comprises three items of a company enterprise code, a customer enterprise code, and a using platform name as shown in the set-up operation picture plane 84 in FIG. 6. When the individual information input 106 is completed, by operating the authorizing request key 172, an authorizing request 108 of the user and the OS is performed from the WWW browser 85 to the common gate interface 82 of the set-up supporting server 16. In response to the authorizing request 108, the ID code of the EDI client 12 for order receiver and each information of the company code, customer enterprise code, and using platform name serving as individual information 106 inputted by using the set-up operation picture plane 84 are sent. The set-up supporting server 16 which received the authorizing request 108 retrieves the ID code received by the authorizing request with reference to the customer management table 80 in FIG. 3. When the coincident ID code is found, it is determined that the collation of the ID code is successful. Further, the adaptation of the using platform sent by the authorizing request is discriminated. If it is adapted, as shown in FIG. 3, the company code, customer code, and using platform name are registered into the columns of the relevant ID code, respectively. Thus, the authorization of the user and the OS is completed. When the authorization of the user and the OS on the set-up supporting server 16 side is finished, the set-up supporting server 16 down-loads the down-loading resources 70. That is, a down-load 110 of the model table 72 is performed and a model table 88 is stored into the EDI client 12 for order receiver. By performing an EXE file down-load 112 of the conversion execution programming module 76, a conversion execution programming module 114 is stored into the client side. Further, a down-load 116 of the IN file for testing 78 is performed and the IN file for testing 78 is stored into an IN file 94 on the client side. When the down-load of the down-loading resources 70 from the set-up supporting server 16 is completed, in the EDI client 12 for order receiver, a converting process from the model table 88 to a company table 92 using the input individual information 106 from the set-up operation picture plane 84 is executed by the conversion execution programming module 114. The converting process from the model table 88 to the company table 92 is performed by merely substituting the individual information with respect to the use set table 74 and mapping table 56. That is, as for the use set table 74, the company code and customer code serving as individual information inputted by the set-up operation picture plane 84 are substituted in the columns of the company code 144 and customer code 146 in the first use set table 74-1 in FIG. 4. As for the mapping table 56, the order receiver enterprise code and order issuer enterprise code which were inputted as individual information are substituted into the sixth and tenth rows in the QSE area 216 in FIG. 7C. As a company table 92 necessary to set up the translator 36, there are two tables of the use set table 74 and mapping table 56 in which the individual information was substituted. However, in order to make it possible to change and add the items in the mapping table 56 during the use, with regard to the standard message table 52 and local layout table 54 as well, they are stored as they are into the company table 92. In this case, with respect to the local layout table 54, the order issuer enterprise code and order receiver enterprise code which were inputted as individual information are substituted as for the sixth and seventh rows of the SEQ name 230 in FIGS. 8A and 8B. When the set-up of the translator 36 is completed as mentioned above, the conversion test of the translator 36 is performed by using the IN file for testing which has been down-loaded in the IN file 94. In the conversion test, a forward conversion such that the standard IN file for testing 78-1 in FIGS. 10A and 10B stored in the IN file 94 is inputted to the translator 36 and a local OUT file is stored into the OUT file 38. As necessary, on the other hand, it is also possible to perform an opposite conversion such that the local IN file for testing 78-2 in FIG. 11 which was down-loaded into the IN file 94 is inputted to the translator 36 and is converted into the standard message and stored into the OUT file 38. After completion of a conversion test 118 of the translator 36 using the local IN file for testing 78 which was down-loaded in the IN file 94, LOG information of the translator 36 in association with the conversion test is recorded into an LOG file 96 and, at the same time, a test result 120 is notified to the JAVA applet 86. The JAVA applet 86 supplies the test result 120 of the conversion test to the common gate interface 82 as a set-up processing result information notification 122 of the translator 36. Therefore, if the test result indicates "normal", "0" is registered into the column of the execution result 132 in the customer management table 80 in FIG. 3. If it indicates "error", "99" is registered therein. Further, the date and time are stored in the column of the notification date/time 134 which received the processing result information notification 122. When the execution result "0" is registered in the execution result 132 in the customer management table 80, the EDI client 12 for order receiver having the ID code corresponding to it completes the EDI connection test and can immediately enter the use of the order issuing operation by the EDI message from the EDI server 10 for order issuer in FIGS. 1A and 1B.

Figure 12:
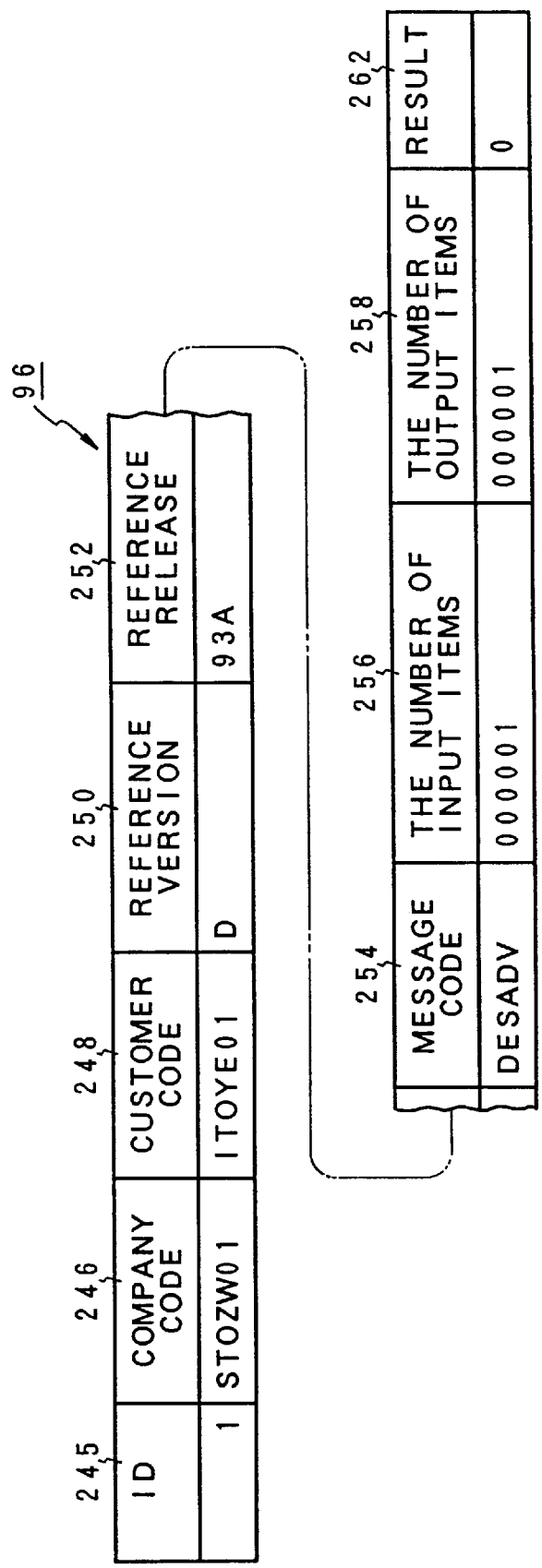
FIG. 12 is an explanatory diagram of an LOG file in FIGS. 2A and 2B.

FIG. 12 shows the LOG file 96 provided for the EDI client 12 for order receiver in FIGS. 2A and 2B. The LOG file 96 has an ID code 245, a company code 246, a customer code 248, a reference version 250, a reference release 252, a message code 254, the number of input items 256, the number of output items 258, and a result 260. In the LOG file 96, the conversion test of the translator 36 using the IN file for testing by the completion of the set-up is performed. The LOG information in the case where the conversion can be normally performed is registered. The contents of the LOG file 96 in FIG. 12 can be seen as an LOG file read picture plane 96-1 in FIG. 13. That is the result of the conversion test after completion of the set-up of the translator 36 can be confirmed by the LOG file read picture plane 96-1 shown in the diagram.

Figure 14:
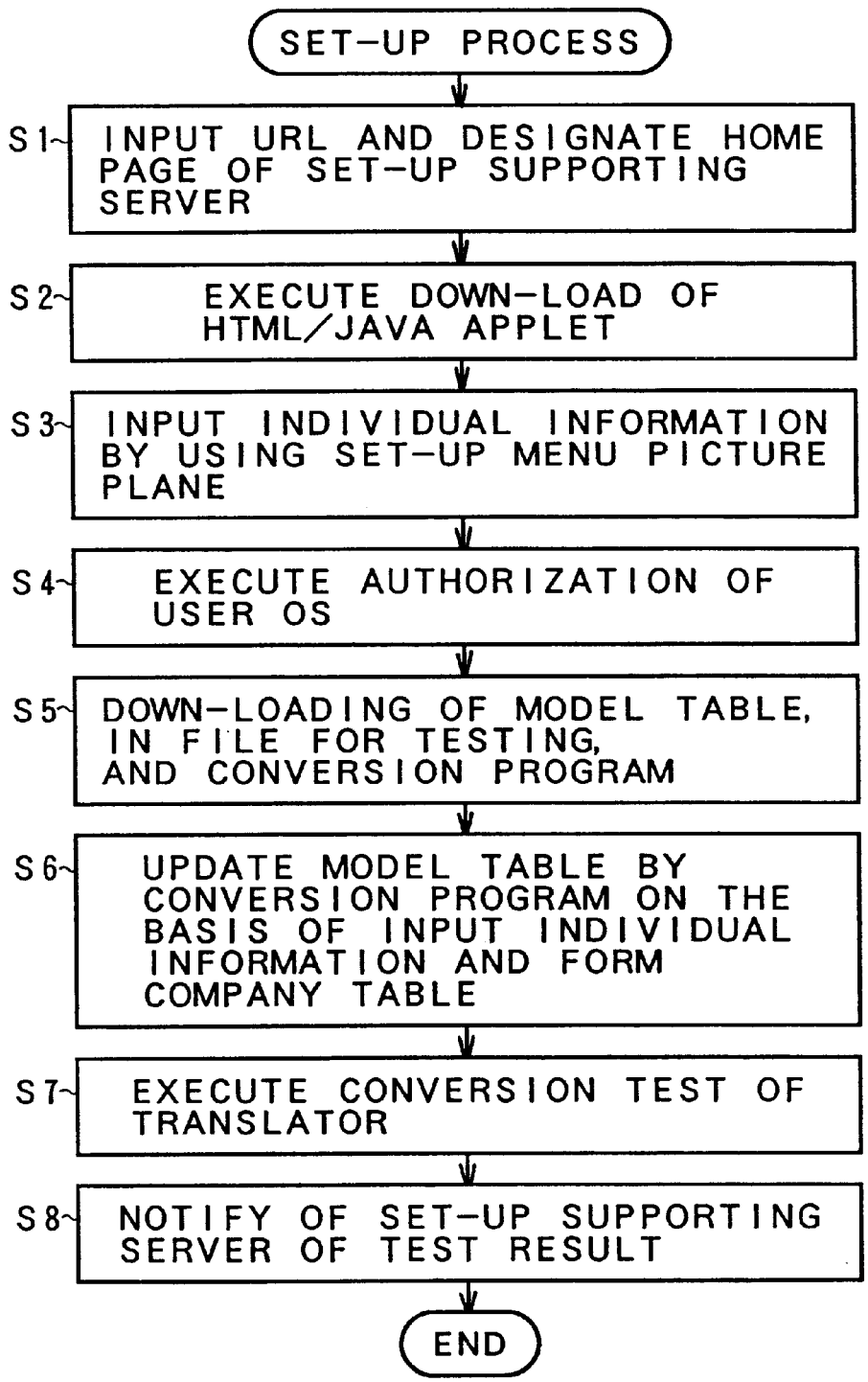
FIG. 14 is a flowchart for a set-up process in FIGS. 2A and 2B.

FIG. 14 shows a flowchart for a processing procedure of the set-up process to the translator 36 provided in the EDI client 12 for order receiver in FIGS. 2A and 2B. First in step S1, when the URL of the set-up supporting server 16 is inputted and a homepage of the HTML file is designated by the WWW browser 85 on the client side, the down-loading of the HTML file and JAVA applet is executed in step S2. By the down-loading, the individual information necessary to set-up is inputted in step S3 by using the set-up operation picture plane, namely, the set-up menu picture plane 84 displayed in the WWW browser 85. Subsequently in step S4, by operating the authorizing request key, the authorizing request of the user and the OS is performed to the set-up supporting server 16. The collation of the user ID and the authorizing process of the OS to check the adaptivity of the platform which gives the operation environment of the module of the conversion executing program are executed. When the ID collation and the OS authorization are obtained, in step S3, the model table 72, IN file for testing 78, and conversion executing programming module 76 are down-loaded from the set-up supporting server 16 side. Subsequently in step S6, the updating of the model table 88 by the substitution of the individual information is performed by the down-loaded conversion execution programming module 114 and the company table 92 is formed. Specifically speaking, the individual information is substituted into the use set table 74 and mapping table 56. Thus, the set-up of the translator 36 is completed. In step S7, the conversion test of the translator 36 in which the set-up has been completed is executed by using the IN file for testing which was down-loaded into the IN file 94. The execution result of the conversion test is notified to the set-up supporting server 16 in step S3. When the result of the conversion test indicates "normal", it is regarded that the EDI connection test has been completed. The system can enter the using mode.

Mapping Table

The function of the mapping processing module 50 to form the mapping table 56 by the linking process for making each item in the standard message table 52 correspond to the local layout table 54 by the mapping server 18 in FIGS. 1A and 1B will now be described. In the following description, the standard message table 52 and local layout table 54 are simply referred to as a standard message 52 and a local message 54.

FIG. 15 shows a mapping registration picture plane 55 which is used in the mapping operation to link the items in the standard message 52 and the items in the local message 54 by the mapping processing module 50. In the mapping registration picture plane 55, an arbitrary standard message 52 is displayed on the left side and the local message 54 is displayed on the right side in a line. The standard message 52 and local message 54 have: tag display portions 262 and 266 showing a message structure; and data portions 264 and 268 in which data regarding elements constructing each message has been stored. An element tag 270 in the tag display portion 262 of the standard message 52 displayed in the mapping registration picture plane 55 is selected by a mouse click. An element tag 272 in the local message 54 corresponding to the element tag 270 is selected and is mouse-clicked. Thus, a link line 274 showing a link between the element tag 270 and element tag 272 is displayed. Although the link line 274 can be displayed by a mouse-click of the element tags 270 and 272, it is also possible to construct in a manner such that the element tag 270 is mouse-clicked and while dragging, the link line 274 is displayed when it is set into the element tag 272 in the local message 54 and is separated. Since the link line 274 is displayed by linking due to the selection of the element tag 270 of the standard message 52 and the element tag 272 of the local message 54, the linking relation between the elements of both messages is shown as an image to the operator. When the linking of the element tag 270 of the standard message 52 is finished, according to the invention, the element tag having the same relevance code as the relevance code set in the element tag 270, for example, an element tag 276 flickers, thereby informing the operator of a fact that it is the relevance information of the element tag 270 after the linking was finished. It will be obviously understood that the element tag 276 can be inversely displayed or its color can be switched to a conspicuous color in place of flickering the element tag 276. Consequently, the operator can immediately know that the flickering element tag 276 is the relevance information of the element tag 270 after the linking has already been finished. With respect to the element tag 276 among the grouped tags in which the relevance code is identical, the linking is performed between the element tag 276 and, for example, the element tag 278 of the local message 54, thereby allowing a link line 280 to be displayed. As mentioned above, when the linking between the elements of the standard message 52 and local message 54 displayed in the mapping registration picture plane 55 is finished, by performing the registering operation on the picture plane, the mapping table 56 in which the link information of the local message 54 has been fetched is registered into the standard message 52.

Figure 16A:
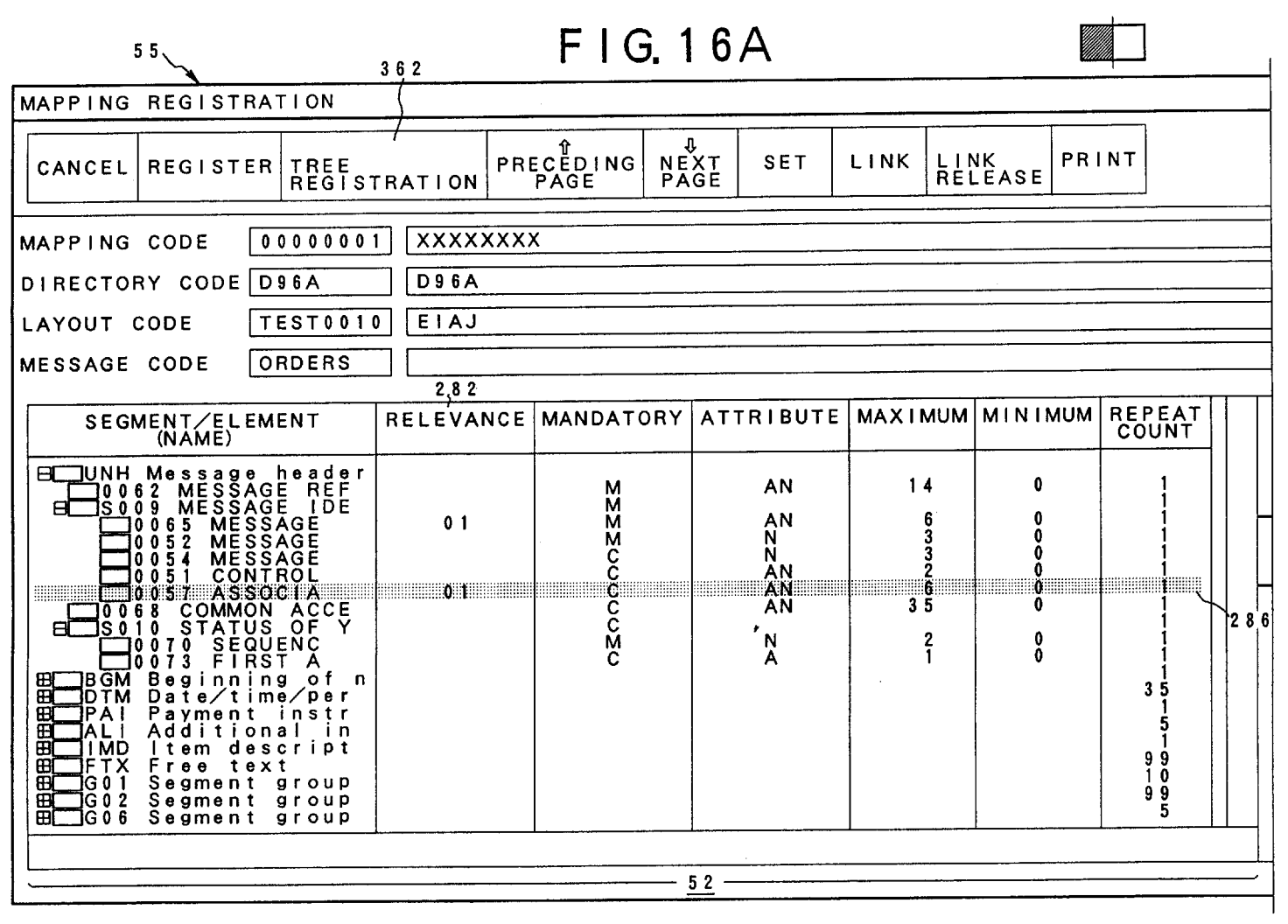
Figure 16B:
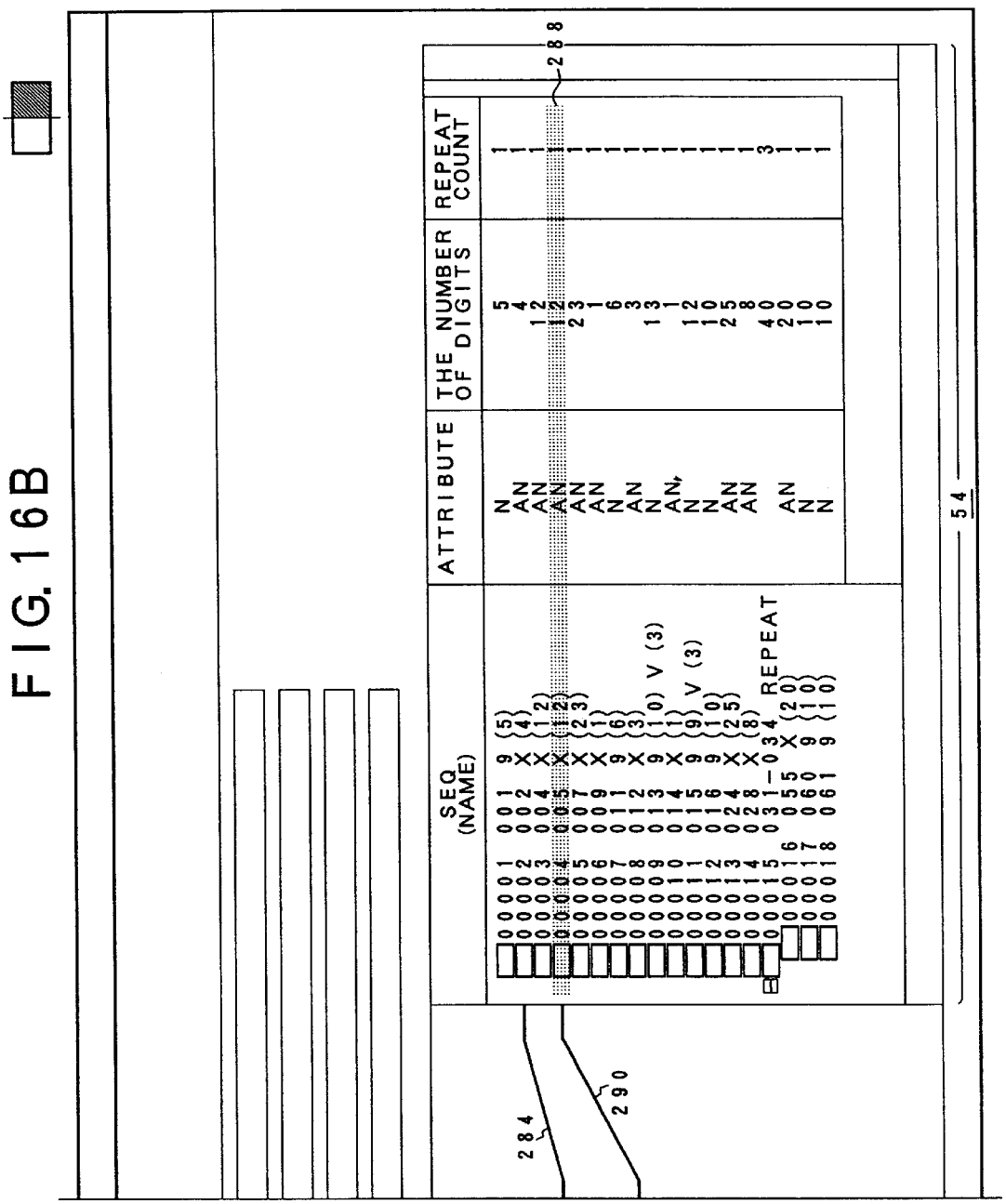

FIGS. 16A and 16B show a specific example of the mapping registration picture plane 55 by the mapping processing module in FIGS. 2A and 2B. The standard message 52 of EDIFACT is displayed on the left side and the local message 54 of EIAJ is displayed on the right side. A cancel key, a registering key, a tree developing key, a preceding page key, a next page key, a set key, a link key, a link release key, a print key, and the like are arranged on the upper column of the mapping registration picture plane 55. In the next column, a mapping code, a directory code, a layout code, and a message code are displayed. Among them, a layout code "TEST0010" indicates the message kind of EIAJ message serving as a local message. A next message code "ORDERS" shows the message kind of EDIFACT. In the display column of the standard message 52, columns of segment/element (name), relevance information, mandatory information, attribute information, the maximum digit, the minimum digit, and a repeat count are provided, respectively. The mandatory information is set to a code M if it is mandatory and is set to a code C if it is conditional. The attribute information is set to text type A, a numerical value type N, and a combination type AN. In an area of the segment/element, a tag code and a nest structure according to a hierarchy structure of the standard message are displayed in FIG. 17.

Figure 17:
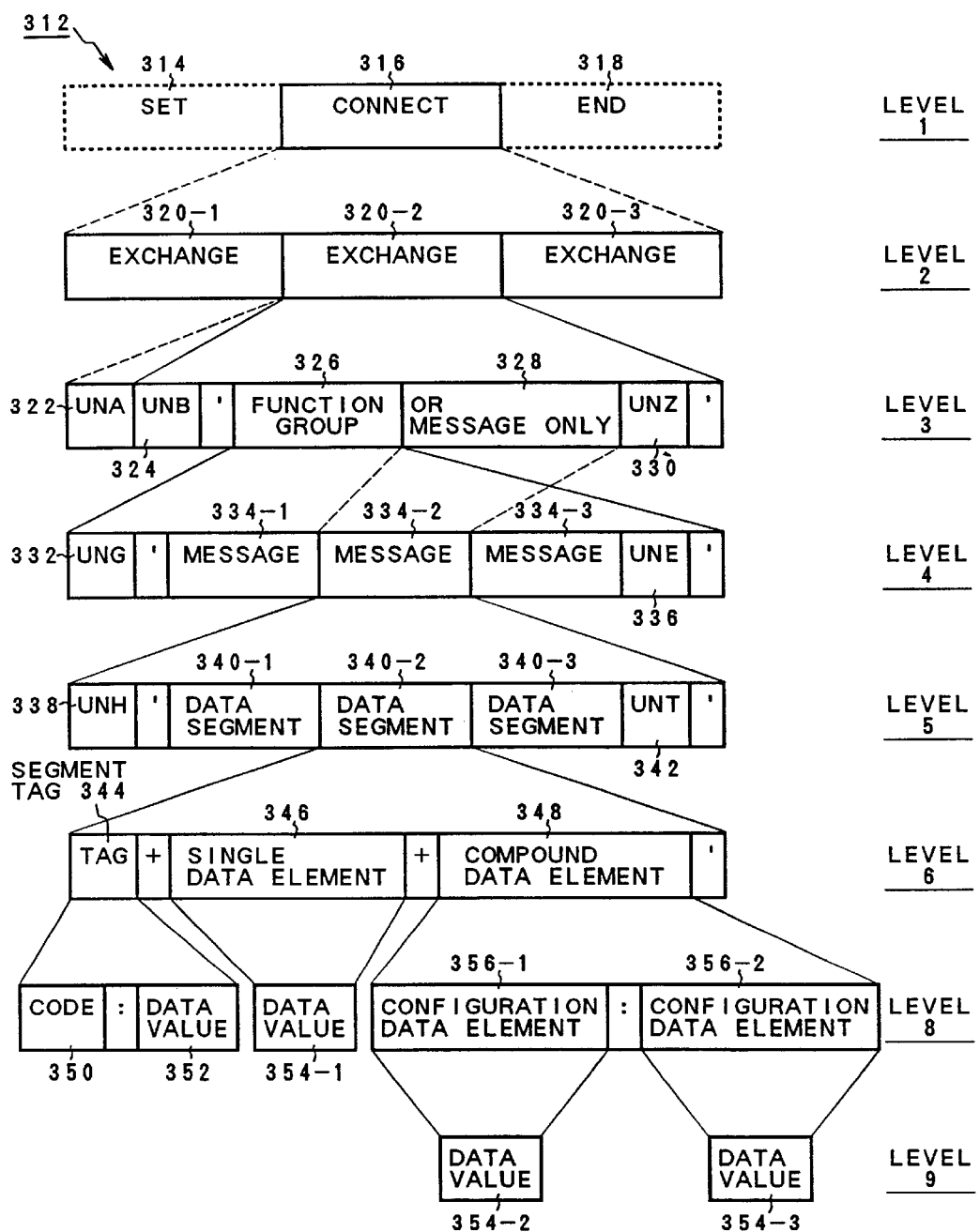
FIG. 17 is an explanatory diagram of a message structure of EDIFACT.

In the message hierarchy structure of FIG. 17, first, as shown at the level 1 of the top stage, as for the transfer data between the user terminal apparatuses, a set area 314 and an end area 318 are provided before and after a connection 316 according to the standard format of EDIFACT. The set area 314 and end area 318 conform with protocols of the communicating modules 30 and 32 in FIGS. 1A and 1B and they are not particularly determined in the EDIFACT international standard. As separately shown at the level 2, the connection 316 includes one or a plurality of exchanges, for example, exchanges 320-1 to 320-3. In the exchanges 320-1 to 320-3, for example, when seeing the center exchange 320-2, as separately shown at the level 3, service string information 322 shown by an service segment UNA, an exchange header 324 shown by the service segment UNB, a function group 326, or only a message 328, and an exchange trailer 330 shown by a service segment UNZ are provided. As separately shown at the level 4, the function group 326 has a function group header 332 shown by a service segment UNG, a plurality of messages of the same type, for example, messages 334-1 to 334-3, and a function group trailer 336 shown by a service segment UNE. On the other hand, with respect to a case of only the message 328, for example, only the center message 334-2 is provided. As separately shown at the level 5, the message 334-2 has a message header 338 shown by the service segment UNH, a plurality of data segments, for instance, data segments 340-1 to 340-3, and a message trailer 342 shown by the service segment UNT. As separately shown at the level 6 with respect to the center data segment 340-2, each of the data segments 340-1 to 340-3 has a segment tag 344, one or a plurality of single data elements 346, and one or a plurality of compound data elements 348. As separately shown at the level 7, the head segment tag 344 has a segment code 350 and a data value 352 which gives a repetition/nest value. The single data element 346 is a set of data values 354-1. The compound data element 348 has a plurality of configuration data elements, for example, two configuration data elements 356-1 and 356-2. As shown at the level 8, the configuration data elements 356-1 and 356-2 have data values 354-2 and 354-3. It will be understood that the single data elements 346 are grouped.

As messages 334-1 to 334-3 at the level 4 in the hierarchy structure of FIG. 17, for example, messages as shown in FIGS. 18, 19, and 20 are used. FIGS. 18 and 19 show messages in which the classification is set to "order receiving/issuing relation". As message tags, "INVOIC", "ORDERS", "ORDCHG", . . . , "PRICAT", "PRDSPE" are shown as examples. A definition of a function of the message code shown on the right side has been determined in correspondence to each message tag. For example, in the mapping registration picture plane 55 in FIGS. 16A and 16B, "ORDERS" at the second stage in FIG. 18 is called as a message code. The message code "ORDERS" is a message showing the details with respect to articles or services ordered under the agreed terms between the seller and the buyer. FIG. 20 relates to messages in which the classification is set to "articles/management" and shows "DELFOR", "DELJIT", "DESADV", . . . , and "DISRPT". Besides them, various messages are prepared in EDIFACT. At the present time point, 189 kinds of messages are prepared.

FIG. 21 is a part of a message table 360 prepared every message kind in FIGS. 18 to 20 and shows a message table, as an example, of the message "DESADV" at the third stage in the classification "articles/management" in FIG. 20. In the message table 360, a message tag "DESADV" is set subsequent to a directory code. Information of a name, a segment code, a segment code name, a level, mandatory, and a repeat count has been set every sequence SEQ1, SEQ2, . . . .

Figure 22B:
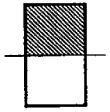

FIGS. 22A and 22B show an example of a segment table 362 to define the data segments 340-1 to 340-3 at the level 5 constructing the message 334-2 in FIG. 17. In the segment table 362, a segment code is provided after a directory code on the right side. Subsequently, a segment code name, a single compound element code, a level, mandatory, a name, an attribute, the minimum number of digits, the maximum number of digits, and a repeat count are set. For example, a segment code "AGR" is defined in the first to seventh rows of the segment table 362. The single compound element codes "C543", "7431", . . . , and "9419" are included in the segment code "AGR". An element code in which a symbol "C" is added to the head is a compound data element. An element code in which the symbol "C" is not added is a single data element.

FIG. 23 shows a single data element table 364 in which the single data elements provided in the segment table 362 in FIGS. 22A and 22B have been defined. In the single data element table 364, a directory code, an element code, a name, an attribute, the minimum number of digits, the maximum number of digits, and the like are defined from the left side.

FIG. 24 shows a compound data element table 366 in which the compound data elements which are used in the segment table 362 in FIGS. 22A and 22B have been defined. In the compound data element table 366, a directory code, a compound element code, a compound element code name, a sequence, an element code, and an element code name are stored from the left side. That is, the compound data element defines a set of single data elements shown in FIG. 23. For example, in the first to fourth rows in the compound data element table 366, the same compound element code "C002" is set. Single element codes "1001", "1131", "3055", and "1000" are stored therein.

In the standard message 52 on the left side of the mapping registration picture plane 55 in FIGS. 16A and 16B, by designating the message code "ORDERS", the message table 360 comprising the set of segment codes as shown in FIG. 21, namely, the contents at the level 4 in the hierarchy structure in FIG. 17 are displayed. By operating a tree developing key 362 in the upper portion of the screen by mouse-clicking a folder mark of a specific data segment, the picture plane is developed to a detailed element structure below the level 5 in FIG. 17. That is, in the mapping registration picture plane 55 in FIGS. 16A and 16B, the screen is developed until the head service segment (message header) UNH and subsequent segment codes "S009" and "S010" and the contents up to the element structure are displayed. With respect to subsequent segment codes "BGM", "DTM", . . . , they are shown in a closed state. On the other hand, in the local message 54 on the right side in FIGS. 16A and 16B, an SEQ (name) showing the element structure, attribute information, the number of digits, and a repeat count are displayed. The local message 54 is an EIAJ local message like a layout code shown in the upper portion. In the mapping registration picture plane 55, a link line 284 has already been set between an element code "0065" of the standard message and an SEQ "00002" of the local message 54. In the setting of the link line 284, a relevance code "01" is stored in a relevance code storing area 282 of the element code "0065" of the standard message 52. Therefore, at the stage after completion of the linking, the column of an element code "0057" having the same relevance code "01" in the standard message 52 is inversely displayed 288, thereby promoting the execution of the next linking. The operator, therefore, selects an element of, for instance, SEQ "00004" as an element code in the local message 54 on the right side having the corresponding relation with the segment code "0057" which was inversely displayed 288 on the basis of the relevance code "01" and the elements are made active by mouse-clicking, so that the display is switched to the inversion display 288. When the linking by making the standard element and the local element active is performed as mentioned above, a matching between the elements is checked. In this case, since both elements are set to the attribute code "AN", they are matched. With respect to the data length, the maximum number of digits on the standard side is equal to 6 and that on the local side is equal to 12. The matching condition such that the local data length is equal to or less than the standard data length is not satisfied. In this case, by operating the set key, the set picture plane is opened and a condition such that with respect to the number of digits (12) of the local element, for example, six digits from the head are validated in accordance with the maximum number of digits (6) of the standard element is set. Further, since both of the repeat counts are equal to 1, they are matched. Therefore, since a result of the matching check is "normal", a link line 290 is displayed between the standard element "0057" and the local element "00004". In a manner similar to the above, the linking is performed on an element unit basis of the standard message 52 and local message 54.

Error Recovery

FIGS. 25A and 25B are function explanatory diagrams of an error recovery by the supporting mail server 20 in the case where errors occur during the conversion in the translator 36 of the EDI client 12 for order receiver in FIGS. 1A and 1B. Now, the local format file 24 in FIGS. 1A and 1B is referred to as an IN file 24, the international standard format file 28 is labeled as an OUT file 28, the international standard format file 34 is called an IN file 34, and the local format file 38 is referred to as an OUT file 38. When the EDI connection test by the completion of the set-up of the translator 36 of the EDI client 12 for order receiver is finished, the EDI system is started to be used. An electronic transaction message is transmitted from the EDI server 10 for order issuer to the EDI client 12 for order receiver. In the EDI server 10 for order issuer, when a message according to the local format is formed and stored into the IN file 24 in accordance with a user application, the local message in the IN file 24 is converted into the standard message of EDIFACT by the translator 26 and is stored into the OUT file 28. After that, the standard message is sent to the IN file 34 of the EDI client 12 for order receiver via the internet 14. The translator 36 of the EDI client 12 for order receiver extracts the received standard message from the IN file 34 and converts into the local message and stores into the OUT file 38. A process of the received message by the user application on the client side is also executed. An LOG in association with the converting operation of the translator 26 of the EDI server 10 for order issuer is recorded into an LOG file 27. Similarly, the converting process in the translator 36 of the EDI client 12 for order receiver is also recorded in the LOG file 96. If errors occur in the translator 36 of the EDI client 12 for order receiver during the use of such an EDI system, error information is stored in an error file 98.

Figure 27:
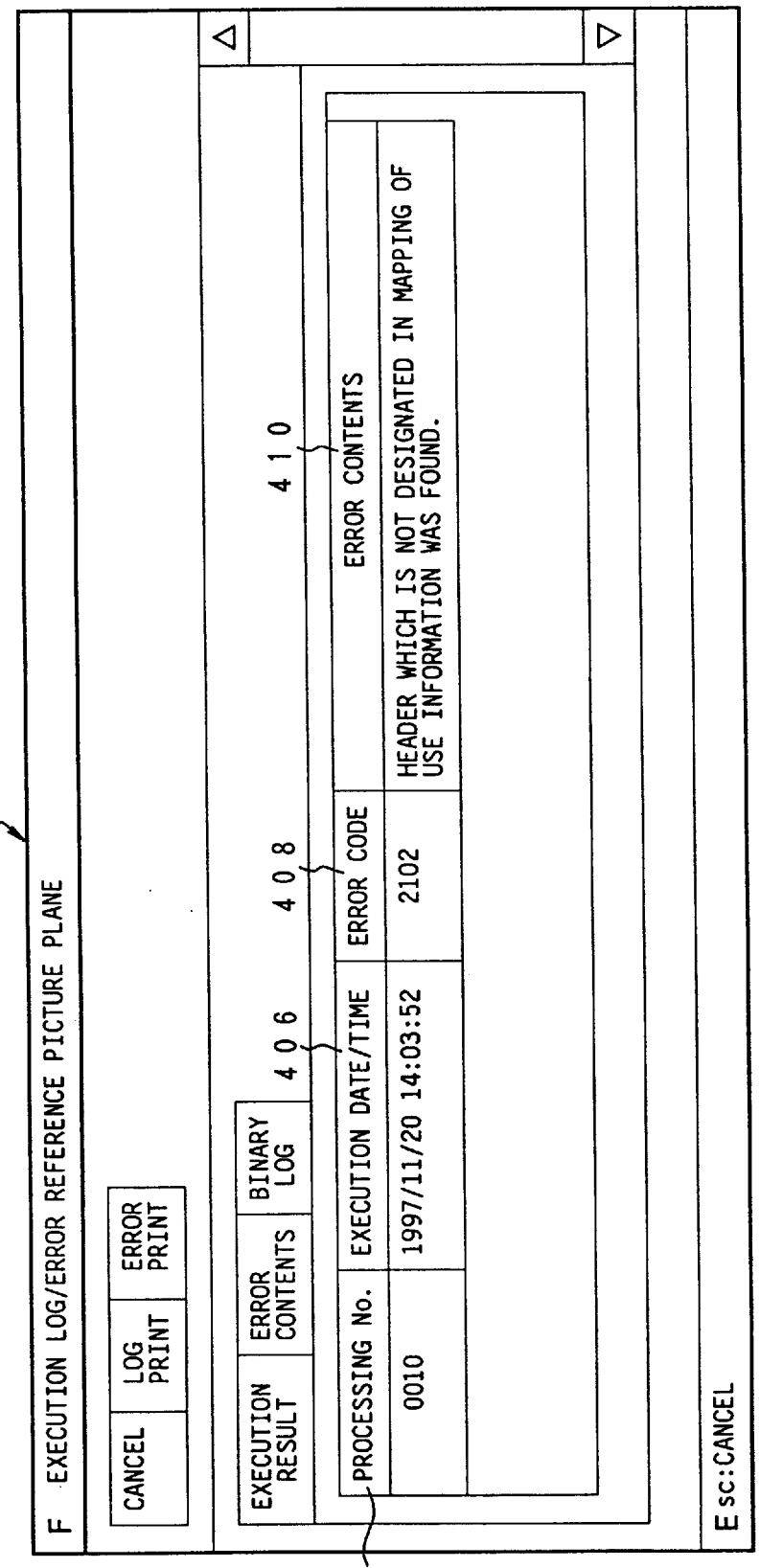
FIG. 27 is an explanatory diagram of a read picture plane of the error file in FIG. 26.

FIG. 26 shows the contents of the error file 98. A processing number 404, a processing date 406-1, a processing time 406-2, an error code 408, and error contents 410 have been registered. FIG. 27 shows an error picture plane 98-1 in which the error file 98 of FIG. 26 is read out and error contents at this time will be understood. FIG. 28 is a list 412 of transmission error contents for a transmitting process of error information of the error file 98. FIG. 29 is a list 413 of reception error contents for a receiving process. In the translator 36 of the EDI client 12 for order receiver in FIGS. 25A and 25B, a receiving process for converting the received standard message into the local message is executed. For example, an error code "2102" in FIGS. 26 and 27 can be registered into the error file 98 by retrieving the error contents of "Header which is not designated in mapping of use information was found."

with reference to the list 413 of reception error contents in FIG. 29. As for the error generation when the local message is contrarily converted to the standard message of EDIFACT by the translator 36 and the message is sent to the EDI server 10 for order issuer, the error contents are registered into the error file 98 with reference to the list 412 of transmission error contents in FIG. 28.

Referring again to FIGS. 25A and 25B, when the errors of the translator 36 occur in the EDI client 12 for order receiver and the registration into the LOG file 96 and error file 98 is finished, the EDI client 12 for order receiver sends the contents in the LOG file 96 and error file 98 at that time to the supporting mail server 20 by an electronic mail and stores into an LOG file 281 and an error file 283.

A mail diagnosis application 65 having the functions of the error diagnosis processing module 62 and error correspondence instructing module 64 in FIGS. 1A and 1B is provided for the supporting mail server 20. When the electronic mail in association with the error generation is received from the EDI client 12 for order receiver, management information is registered into a Q/A management database 290.

FIG. 30 shows the details of the Q/A management database 290. A reception date/time 415 of the electronic mail, a company code 416, a customer code 418, a reference version 420, a reference release 422, a message code 424, the number of input items 426, the number of output items 428, a result code 430, a processing number 432, an execution date/time 434 of the conversion in which an error occurs, an error code 436, and error contents 438 are registered in the column of an ID code 414 showing the EDI client 12 for order receiver.

Figure 31:
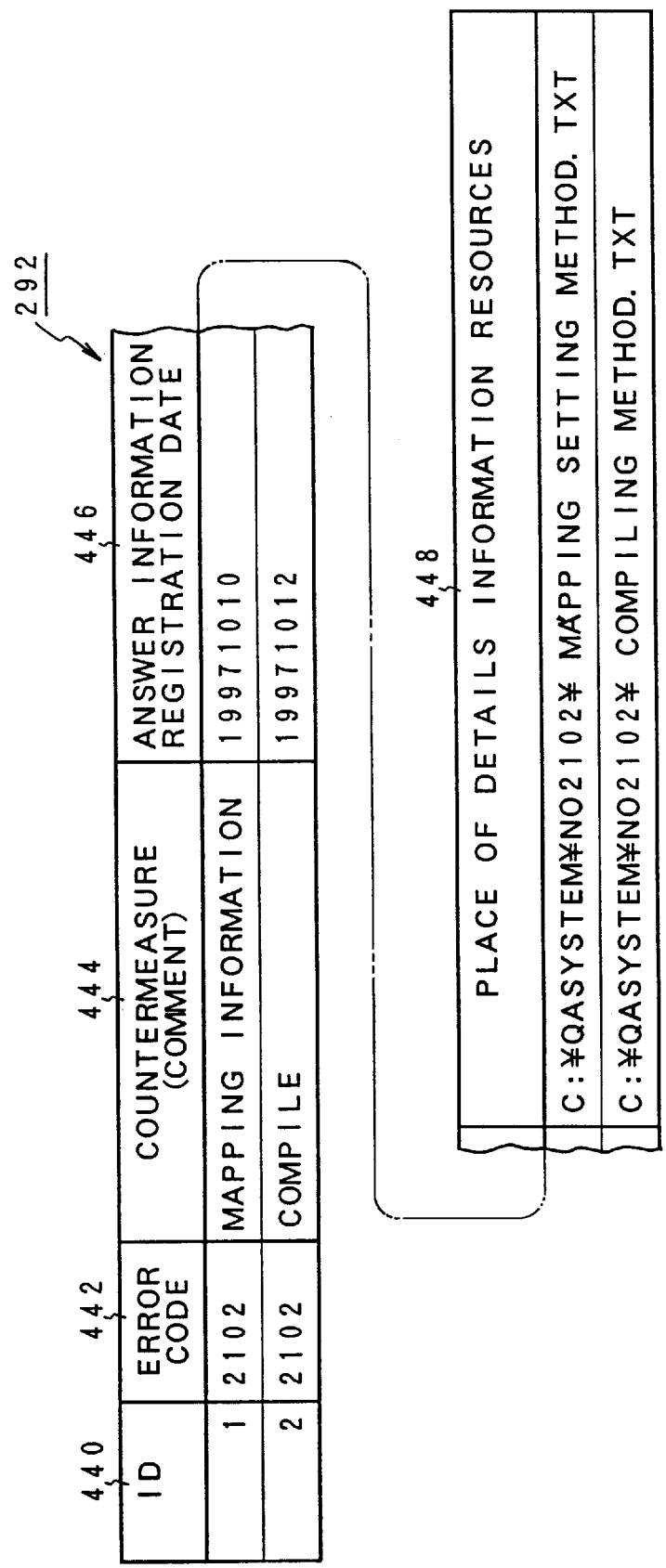
FIG. 31 is an explanatory diagram of a Q/A answer information database in FIGS. 25A and 25B.

Referring again to FIGS. 25A and 25B, when the registration of the management information as shown in FIG. 30 into the Q/A management database is finished, the mail diagnosis application 65 retrieves a Q/A answer information database 292 by using the error code derived from the error file 283 as a key and obtains comment information of a method of taking a countermeasure against the error code. A record layout of the Q/A answer information database 292 is constructed by an ID code 440, an error code 442, a countermeasure method 444, an answer information registration date 446, and a place 448 of detailed information resources as shown in FIG. 31. The countermeasure method obtained from the Q/A answer information database 292 as mentioned above is stored into a corresponding instruction file 294. After that, it is sent to the EDI client 12 for order receiver by an electronic mail and stored into a corresponding instruction reception file 296. The operator reads out the countermeasure method stored in the corresponding instruction reception file 296 to a picture plane 298 and can immediately take a necessary recovering countermeasure for the errors occurring in the translator 36. By the corresponding instruction from the supporting mail server 20 for the error generation of the translator 36 as mentioned above, the operator on the EDI client 12 side for order receiver can rapidly and properly cope with the error generation even if he does not have the knowledge and experience of the EDI syntax and can return to the normal system using state. In the supporting mail server 20, a latest correcting module by version-up or the like to the translator 36 of the EDI client 12 for order receiver can be provided and a service such as addition of a function or the like can be also provided by transmission by a similar electronic mail.

FIG. 32 is a flowchart showing a procedure for an error recovering process using the supporting mail server 20 in FIGS. 25A and 25B. In step S1, when an error occurs in the translator 36 of the apparatus for order receiver serving as an EDI client 12 for order receiver, the error contents are notified to the supporting mail server 20 by transmission of an electronic mail in step S2. The supporting mail server 20 which received the notification of the error contents extracts the countermeasure method by the retrieval of the Q/A answer information database 292 according to the error contents and transmits error correspondence instruction information by an electronic mail. Therefore, an error corresponding instruction based on the error diagnosis result from the supporting mail server 20 is received by a mail in step S3. In step S4, a necessary error recovering process is executed in accordance with the error corresponding instruction received by the mail. In the above embodiment, EDI-FACT of the international standard has been used as a standard format as an example. However, as a standard other than it, even with regard to the CII syntax rule provided at present as a domestic standard EDI in Japan or ANSI X. 12 provided as a domestic standard EDI in the U.S.A., as for the translator for performing the message conversion between the local format and each standard format, a similar set-up supporting process and a similar error recovering process of the translator can be applied as they are.

The functions of the set-up processing module 15 and set-up supporting server 16 provided in the EDI client 12 for order receiver in FIGS. 1A and 1B are realized as control programs for executing those processes. The invention, therefore, includes a computer readable recording medium in which those control programs have been recorded. As such a recording medium, there is a removable portable recording medium such as CD-ROM, floppy disk, or the like, a storing device of a program provider who provides programs via a line, or further, a memory device such as RAM, hard disk, or the like of a processing apparatus in which the programs have been installed. The control programs to realize the functions of the set-up supporting server 16 and set-up processing module 15 of the invention are loaded into the processing apparatus and are executed on a main memory.

According to the invention as mentioned above, the model table and the supporting tool are down-loaded from the set-up supporting apparatus in response to the set-up request from the order receiver apparatus, the set-up process for the translator is automatically executed by merely inputting the individual information, the number of operations of the EDI connection test is remarkably reduced, and even a customer who does not have any knowledge and experience of the EDI syntax can rapidly and properly complete the EDI connection test and can start the use of the system. For the error generation of the translator, a proper error corresponding instruction can be received from the supporting mail server. In case of a simple error, even the general user who does not have any knowledge and experience for the EDI syntax can solve it, so that the user side can cope with most of the errors which occur during the use. Further, since a proper error corresponding instruction can be obtained, the time which is required from the error generation to the settlement is reduced and a using efficiency of the system can be raised. Further, the providing of an additional module or an additional function regarding the translator from the supporting mail server side to the user can be realized by a mail transmission. By grasping the error information on the user side, an error generating situation and a tendency are analyzed and a proper supporting system is established, so that the quality of the system can be improved.

The invention is not limited to the foregoing embodiment but many proper variations and modifications are possible within the scope of the invention without losing the objects and advantages of the invention.

What is claimed is:

1. An electronic transaction system comprising:
   an order issuer apparatus of a first entity having a translator converting a local EDI transaction message conforming to a local EDI format specific to the order issuer apparatus into a standard EDI transaction message conforming to a standard EDI format which is transmitted through a network, where the local and standard messages represent a transaction between the first entity and one of a plurality of other entities;

a plurality of order receiver apparatuses of the other entities, each having a translator converting the standard EDI transaction message conforming to the standard EDI format received through the network into a local EDI transaction message conforming to a local EDI format specific to each of the order receiver apparatuses;

a set-up supporting apparatus storing model information which is used during the conversion of the translators of said order receiver apparatuses and a set up supporting tool interactively editing said model information and setting up to be used by said translator, the model information comprising information defining a local EDI message format, information defining a standard message format, and information mapping between the local message format and the standard message format.

2. An electronic transaction system comprising:

an order issuer apparatus having a translator for converting a local EDI transaction message conforming to a local EDI format specific to the order issuer apparatus into a standard EDI transaction message conforming to a standard EDI format which is transmitted through a network;

a plurality of order receiver apparatuses each having a translator for converting the standard EDI transaction message conforming to the standard EDI format received through the network into a local EDI transaction message conforming to a local EDI format specific to each of the order receiver apparatuses;

a set-up supporting apparatus storing model information which is used for the conversion of the translators of said order receiver apparatuses and a set up supporting tool for correcting said model information and setting up into said translator; and a set-up processing apparatus, provided for said order receiver apparatuses, for receiving a down-load of said model table and set-up supporting tool by a supporting request to said set-up supporting apparatus and automatically setting up said translator on the basis of individual information, wherein as said model information, said set-up supporting apparatus stores:
  a local message table in which a local EDI message format has been defined;
  a standard message table in which a standard message format has been defined;
  a mapping table in which a relation between said local message table and said standard message table has been defined; and
  a use set table in which kinds of said mapping table and said local message table have been set, and as said set-up supporting tool, said set-up supporting apparatus stores:
  a set-up operation picture plane;
  a set-up executing module; and
  a platform serving as a virtual machine environment for making said set-up executing module operative, and said set-up processing apparatus receives the down-load of said set-up operation picture plane and said platform in response to the supporting request to said set-up supporting apparatus, inputs the individual information by using said set-up operation picture plane, and after that, performs an authorization requesting operation, thereby receiving a down-load of said local message table, standard message table, mapping table, use set table, and set-up executing module, correcting said mapping table and said use set table on the basis of said individual information, converting into a table peculiar to a company corresponding to the individual information, and setting up said table into the translator.

3. A system according to claim 2, wherein said set-up processing apparatus inputs a company enterprise code, customer enterprise code, and a using platform as said individual information and notifies said set-up supporting apparatus of said company enterprise code, customer enterprise code, using platform, and further an authorizing request including an ID code on the basis of the authorization requesting operation, and said set-up supporting apparatus has a customer management table in which an ID code of a partner who executes an electronic transaction has previously been registered, registers said company enterprise code, customer enterprise code, and using platform into said customer management table when a collation coincidence of the ID code and an adaptation of the using platform are obtained from said set-up processing apparatus on the basis of the authorizing request, and further, executes the down-load of said model table and said set-up supporting tool into said set-up processing apparatus on the basis of a success in said authorizing process.

4. A system according to claim 3, wherein said set-up executing module which was down-loaded into said set-up processing apparatus changes said mapping table and said company enterprise code and customer enterprise code in said use set table to the company enterprise code and customer enterprise code inputted by said operation picture plane, thereby converting into a mapping table and use set table which are peculiar to the company.

5. A system according to claim 2, wherein said set-up supporting apparatus further stores a local transaction message for testing and a standard transaction message for testing and down-loads said transaction messages for testing in response to the supporting request from said set-up processing apparatus, and said set-up processing apparatus executes a conversion test of the translator in which the set-up was completed by said down-loaded transaction messages for testing and notifies said set-up supporting apparatus of a test result.

6. A system according to claim 1, wherein as said model information, said set-up supporting apparatus stores:
  a mapping table in which linking relation between a local message table in which a local EDI message format has been defined and a standard message table in which a standard EDI message format has been defined; and
  a use set table in which a kind of said mapping table has been set, and as said set-up supporting tool, said set-up supporting apparatus stores:
  a set-up operation picture plane;
  a set-up executing module; and
  a platform serving as a virtual machine environment for making said set-up executing module operative, and said set-up processing apparatus receives a down-load of said set-up operation picture plane and platform in response to the supporting request to said set-up supporting apparatus, inputs the individual information by using said set-up operation picture plane, and after that, executes an authorization requesting operation, thereby receiving a down-load of said mapping table, use set table, and set-up executing module, correcting said mapping table and use set table on the basis of said individual information, converting into a table which is peculiar to a company, and setting up into a translator for order reception.

7. A system according to claim 6, wherein said set-up processing apparatus inputs a company enterprise code, customer enterprise code, and a using platform as said individual information and notifies said set-up supporting apparatus of said company enterprise code, customer enterprise code, using platform, and further an authorizing request including an ID code on the basis of the authorization requesting operation, and said set-up supporting apparatus has a customer management table in which an ID code of a partner who executes an electronic transaction has previously been registered, registers said company enterprise code, customer enterprise code, and using platform into said customer management table when a collation coincidence of the ID code and an adaptation of the using platform are obtained from said set-up processing apparatus on the basis of the authorizing request, and further, executes the down-load of said model table and said set-up supporting tool into said set-up processing apparatus on the basis of a success in said authorizing process.

8. A system according to claim 7, wherein said set-up executing module which was down-loaded into said set-up processing apparatus changes said mapping table and said company enterprise code and customer enterprise code in said use set table to the company enterprise code and customer enterprise code inputted by said operation picture plane, thereby converting into a mapping table and use set table which are peculiar to the company.

9. A system according to claim 6, wherein said set-up supporting apparatus further stores a local transaction message for testing and a standard transaction messages for testing and down-loads said transaction message for testing in response to the supporting request from said set-up processing apparatus, and said set-up processing apparatus executes a conversion test of the translator in which the set-up was completed by said down-loaded transaction messages for testing and notifies said set-up supporting apparatus of a test result.

10. A system according to claim 1, further comprising:

an error mail transmitting apparatus for transmitting error contents as an electronic mail when an error occurs in the translator of said order receiver apparatus;

a supporting mail apparatus for obtaining countermeasure information for the generated error by a retrieval of a database based on said error contents when the electronic mail is received from said error mail transmitting apparatus and returning an electronic mail; and an error correspondence processing apparatus for receiving the electronic mail from said supporting mail apparatus and presenting the countermeasure information for the generated error of said translator.

11. An electronic transaction system, comprising:

a translator performing a conversion between a local EDI transaction message of a local EDI format specific to the order issuer apparatus and a standard EDI transaction message of a standard EDI format which is transmitted and received through a network; and a set-up processing apparatus receiving a down-load of a model table and a set-up supporting tool by a supporting request to said set-up supporting apparatus and automatically setting up said translator on the basis of individual information, the model table comprising information defining the local EDI message format, information defining the standard EDI message format, and information mapping between said local EDI message format and said standard EDI message format, where the supporting tool is used to interactively edit the model and individual information.

12. A set-up supporting apparatus for supporting a set-up of a translator to perform a conversion between a local EDI transaction message conforming to a local EDI format specific to an electronic transaction system and a standard EDI transaction message of a standard EDI format which is transmitted by a first entity and received through a network by a second entity, comprising:

a model EDI translation table which is used to set up a translator of an order receiver apparatus, the model EDI translation table comprising information defining the local EDI message format, information defining the standard EDI message format, and information mapping between said local EDI message format and said standard EDI message format; and a set-up supporting tool for interactively editing said model table and setting up the model in the translator, wherein in response to a supporting request from said electronic transaction system, said model EDI translation table and set-up supporting tool are down-loaded, thereby allowing a set-up process of said translator to be automatically executed.

13. An apparatus according to claim 12, wherein as said EDI translation model table, a local message table in which a local EDI message format has been defined, a standard message table in which a standard EDI message format has been defined, a mapping table in which a relation between said local message table and said standard message table has been defined, and a use set table in which kinds of said mapping table and said local message table have been set are stored, and as said set-up supporting tool, a set-up operation picture plane, a set-up executing module, and a platform serving as a virtual machine environment for making said set-up executing module operative are stored, and on the basis of the supporting request from said electronic transaction system, said set-up operation picture plane and platform are down-loaded, and in response to an authorizing request in association with an input of individual information using said set-up operation picture plane, said local message table, standard message table, mapping table, use set table, and set-up executing module are downloaded, are converted into a table peculiar to a company by a correction of said mapping table and use set table based on said individual information, and are set up into the translator.

14. An apparatus according to claim 13, further having a customer management table in which an ID code of a partner who executes an electronic transaction has previously been registered, and wherein when a company enterprise code, a customer enterprise code, a using platform, and further, an authorizing request including an ID code from said electronic transaction system are received, if a collation coincidence of the ID code and an adaptation of the using platform are derived, said company enterprise code, customer enterprise code, and using platform, into said customer management table are registered, and further, said model table and set-up supporting tool are down-loaded into a set-up processing apparatus on the basis of a success in said authorizing process.

15. An apparatus according to claim 14, wherein said set-up executing module which was down-loaded into said electronic transaction system changes said company enterprise code and customer enterprise code in said mapping table and use set table to a company enterprise code inputted by said operation picture plane, thereby converting into a mapping table and a use set table which are peculiar to a company.

16. An apparatus according to claim 13, wherein a transaction message for testing is further stored, said transaction message for testing is down-loaded in response to the supporting request from said set-up processing apparatus, and said set-up executing module allows said translator in which the set-up was completed to execute a conversion test and to notify of a test result.

17. An apparatus according to claim 12, wherein
as said model EDI translation table,
a mapping table in which a relation between a local message table in which a local EDI message format has been defined and a standard message table in which a standard EDI message format has been defined and
a use set table in which a kind of said mapping table has been set are stored, and
as said set-up supporting tool,
a set-up operation picture plane,
a set-up executing module, and
a platform serving as a virtual machine environment for making said set-up executing module operative are stored, and
on the basis of the supporting request from said electronic transaction system, said set-up operation picture plane and platform are down-loaded, and in response to an authorizing request in association with an input of individual information using said set-up operation picture plane, said local message table, standard message table, mapping table, use set table, and set-up executing module are downloaded, are converted into a table which is peculiar to a company by a correction of said mapping table and use set table based on said individual information, and are set up into the translator.

18. An apparatus according to claim 17, further having a customer management table in which an ID code of a partner who executes an electronic transaction has previously been registered, and wherein when a company enterprise code, a customer enterprise code, a using platform, and further, an authorizing request including an ID code from said electronic transaction system are received, if a collation coincidence of the ID code and an adaptation of the using platform are derived, said company enterprise code, customer enterprise code, and using platform are registered into said customer management table, and further, said model table and set-up supporting tool are down-loaded into a set-up processing apparatus on the basis of a success in said authorizing process.

19. An apparatus according to claim 18, wherein said set-up executing module which was down-loaded into said electronic transaction system changes said company enterprise code and customer enterprise code in said mapping table and use set table to a company enterprise code inputted by said operation picture plane, thereby converting into a mapping table and a use set table which are peculiar to a company.

20. An apparatus according to claim 17, wherein a transaction message for testing is further stored, said transaction message for testing is down-loaded in response to the supporting request from said set-up processing apparatus, and said set-up executing module allows said translator in which the set-up was completed to execute a conversion test and to notify of a test result.

21. A computer readable recording medium in which control programs for executing a format conversion by an electronic transaction have been recorded, comprising:

an order issuer processing module of a first entity having a translator converting a local EDI transaction order message conforming to a local EDI format specific to the order issuer apparatus into a standard EDI transaction message conforming to a standard EDI format which is transmitted and received through a network, where the local and standard messages represent a transaction between the first entity and one of a plurality of other entities;

a plurality of order reception processing modules of the other entities, each having a translator receiving and converting the standard EDI transaction message conforming to the standard EDI format received through the network into a local EDI transaction order message conforming to a local EDI format specific to each of the order receiver modules;

a set-up supporting module storing model information which is used during the conversion of the translators of said order reception processing module and a set-up supporting tool interactively editing said model information and setting up to be used by said translator, the model information comprising information defining the local EDI message format, information defining the standard EDI message format, and information mapping between said local EDI message format and said standard EDI message format; and a set-up processing module, provided for said order reception processing modules, receiving a down-load of said model table and set-up supporting tool by a supporting request to said set-up supporting module and automatically setting up said translator on the basis of individual information.

22. A computer readable recording medium in which control programs for executing a format conversion by an electronic transaction have been recorded, comprising:

a translator for performing a conversion between a local EDI transaction message conforming to a local EDI format and a standard EDI transaction message conforming to a standard EDI format which is transmitted and received through a network; and a set-up processing module receiving a down load of a model table and a set-up supporting tool by a supporting request to an outside and automatically executing a set-up of said translator on the basis of individual information, the model table comprising information defining the local EDI message format, information defining the standard EDI message format, and information mapping between said local EDI message format and said standard EDI message format, where the supporting tool is used to interactively edit the model and individual information.

23. A computer readable recording medium in which control programs for executing a format conversion by an electronic transaction have been recorded, comprising:

a model table which is used by a translator when performing a conversion between a local EDI transaction message conforming to a local EDI format provided in an electronic transaction module and a standard EDI transaction message conforming to a standard EDI format which is transmitted and received through a network the model table comprising information defining the local EDI message format, information defining the standard message format, and information mapping between the local message format and the standard message format, where the supporting tool is used to interactively edit the model table and individual information;

a set-up supporting tool interactively editing said model table and setting to be used by the translator; and a set-up supporting module for down-loading said model table and set-up supporting tool in response to a supporting request from an outside and allowing a setup process of said translator to be automatically executed.

24. A method of electronic transaction translation set up, comprising:

receiving a mapping model comprising information describing a standard EDI message format and also comprising information describing a local EDI message format, and also receiving a set-up tool for editing the mapping model;

using the set-up tool to interactively edit the mapping model and thereby relate parts of the information describing the standard EDI message format to parts of the information describing the local EDI message format; and after said editing and relating, using the mapping model to perform automatic translation between messages conforming to the standard EDI message format and messages conforming to the local EDI message format.

* * * * *